US012803730B2

(12) United States Patent
Liu et al.

(10) Patent No.: US 12,803,730 B2
(45) Date of Patent: Nov. 17, 2026

(54) INDICATION METHOD, TERMINAL DEVICE, AND RADIO ACCESS NETWORK DEVICE

(71) Applicant: HUAWEI TECHNOLOGIES CO., LTD., Shenzhen (CN)

(72) Inventors: Xianda Liu, Beijing (CN); Liuliu Ji, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 307 days.

(21) Appl. No.: 18/344,225

(22) Filed: Jun. 29, 2023

(65) Prior Publication Data

US 2023/0344585 A1 Oct. 26, 2023

Related U.S. Application Data

(63) Continuation of application No. PCT/CN2021/072298, filed on Jan. 15, 2021.

(51) Int. Cl.
*H04L 5/00* (2006.01)
*H04W 52/14* (2009.01)
*H04W 52/54* (2009.01)

(52) U.S. Cl.
CPC ......... *H04L 5/0048* (2013.01); *H04W 52/146* (2013.01); *H04W 52/54* (2013.01)

(58) Field of Classification Search
CPC ... H04L 5/0048; H04L 5/0055; H04L 5/0035; H04L 5/0094; H04W 52/146; H04W 52/54; H04W 52/325; H04W 52/10; H04W 52/08
See application file for complete search history.

(56) References Cited

U.S. PATENT DOCUMENTS

2021/0044385 A1* 2/2021 Hosseini ............... H04L 1/1887
2021/0367730 A1* 11/2021 Chen ..................... H04L 5/0051
2022/0123799 A1* 4/2022 Varatharaajan ...... H04B 7/0456
2022/0330221 A1* 10/2022 Pan ....................... H04L 5/0044
(Continued)

FOREIGN PATENT DOCUMENTS

CN 105589506 A 5/2016
CN 110383905 A 10/2019
(Continued)

OTHER PUBLICATIONS

Extended European Search Report in European Appln No. 21918618.6, dated Dec. 18, 2023, 10 pages.
(Continued)

*Primary Examiner* — Steven Hieu D Nguyen
(74) *Attorney, Agent, or Firm* — Fish & Richardson P.C.

(57) ABSTRACT

This application provides an indication method, a terminal device, and a radio access network device. One example method includes: A terminal device receives indication information indicating an SRS resource, where an index value included in the indication information belongs to a first index value set, the first index value set includes a first index value and a second index value, the first index value and the second index value correspond to two same SRS resource sets. The terminal device sends physical uplink shared channel (PUSCH) data based on the indication information.

12 Claims, 6 Drawing Sheets

(56) References Cited

U.S. PATENT DOCUMENTS

| | | | | |
|---|---|---|---|---|
| 2023/0104029 A1* | 4/2023 | Matsumura | H04W 72/23 370/329 |
| 2023/0132207 A1* | 4/2023 | Yuan | H04B 7/0404 375/267 |
| 2023/0308234 A1* | 9/2023 | Huang | H04L 5/0051 |
| 2023/0328726 A1* | 10/2023 | Shi | H04L 5/0094 370/329 |
| 2024/0114504 A1* | 4/2024 | Gao | H04L 5/0053 |

FOREIGN PATENT DOCUMENTS

| | | | | |
|---|---|---|---|---|
| CN | 110536452 A | 12/2019 | |
| CN | 111294909 A | 6/2020 | |
| EP | 3902305 A1 | 10/2021 | |
| EP | 4258786 A1 | 10/2023 | |
| WO | 2020064727 A1 | 4/2020 | |
| WO | 2020155179 A1 | 8/2020 | |
| WO | 2020198667 A1 | 10/2020 | |
| WO | WO-2021090403 A1 * | 5/2021 | H04L 5/0048 |
| WO | 2022117035 A1 | 6/2022 | |

OTHER PUBLICATIONS

NTT Docomo, Inc, "Discussion on MTRP for reliability," 3GPP TSG RAN WG1 #102-e, R1-2006719, e-Meeting, Aug. 17-28, 2020, 7 pages.
3GPP TS 38.214 V16.4.0, "3rd Generation Partnership Project; Technical Specification Group Radio Access Network; NR; Physical layer procedures for data (Release 16)," Dec. 2020, 169 pages.
International Search Report and Written Opinion in International Appln. No. PCT/CN2021/072298, mailed on Oct. 15, 2021, 15 pages (with English translation).
Lenovo et al., "Enhancements on Multi-TRP for PDCCH, PUCCH and PUSCH," 3GPP TSG RAN WG1 #103-e, R1-2008911, e-Meeting, Oct. 26-Nov. 13, 2020, 15 pages.
Huawei et al., "Enhancements on multi-TRP for reliability and robustness in Rel-17," 3GPP TSG RANWG1 #103-e, R1-2007587, E-meeting, Oct. 26-Nov. 13, 2020, 12 pages.
Nokia et al., "Enhancements for Multi-TRP URLLC schemes," 3GPP TSG RAN WG1 #103-e, R1-2008904, e-Meeting, Oct. 26-Nov. 13, 2020, 15 pages.
Office Action in Japanese Appln. No. 2023-542775, mailed on Jul. 8, 2024, 6 pages (with English translation).

* cited by examiner

INDICATION METHOD, TERMINAL DEVICE, AND RADIO ACCESS NETWORK DEVICE

CROSS-REFERENCE TO RELATED APPLICATIONS

This application is a continuation of International Application No. PCT/CN2021/072298, filed on Jan. 15, 2021, the disclosure of which is hereby incorporated by reference in its entirety.

TECHNICAL FIELD

This application relates to the communication field, and in particular, to an indication method, a terminal device, and a radio access network device.

BACKGROUND

A radio access network device may indicate a precoding indication for uplink transmission (for example, physical uplink shared channel (PUSCH) transmission based on a codebook (CB) or a non-codebook (NCB)) by using a transmission precoding matrix indicator (TPMI) field or a sounding reference signal (SRS), sounding reference signal indication (SRI) field in downlink control information (DCI). The radio access network device may indicate a power adjustment indication for PUSCH transmission by using a transmit power control (TPC) field in the DCI. When there are a plurality of radio access network devices, for example, a plurality of transmission reception points (TRP), as shown in FIG. 1, when two radio access network devices receive PUSCH data, the radio access network devices need to reuse an existing indication field for a corresponding indication, for example, the TPMI field, the SRI field, and the TPC field. In this case, signaling overheads of related indication fields need to be correspondingly multiplied based on a number of TRPs, affecting performance and overheads of DCI transmission. Therefore, how to reduce DCI signaling overheads becomes a problem to be urgently resolved.

SUMMARY

This application provides an indication method, to reduce signaling overheads of transmit power control indication information in a downlink control information DCI field received by a terminal device.

According to a first aspect, an indication method is provided. The method includes: The terminal device receives a sounding reference signal SRS resource indication SRI. An index value included in the SRI belongs to a first index value set. The first index value set includes a first index value and a second index value. The first index value and the second index value correspond to a plurality of same SRS resources. The SRS resources corresponding to both the first index value and the second index value belong to a plurality of SRS resource sets. The first index value and the second index value correspond to different SRS resource sets for which power is to be adjusted. The terminal device sends physical uplink shared channel PUSCH data based on the SRI.

Currently, when the terminal device sends uplink data to a plurality of TRPs, the terminal device needs to multiply, based on a number of TRPs, signaling overheads of transmit power control indication information. In this embodiment of this application, a remaining bit in an SRI field are used, so that two index values correspond to a plurality of same SRS resources. The two index values correspond to different SRS resource sets for which power is to be adjusted, so that each index value may indicate both an SRS resource and an SRS resource set of to-be-adjusted power. This reduces the signaling overheads of the transmit power control indication information. For example, both the first index value and the second index value correspond to an SRS resource 1 and an SRS resource 2. The SRS resource 1 belongs to a first SRS resource set and corresponds to a first TRP data transmission channel. An SRS resource for which power is to be adjusted and that corresponds to the first index value is the SRS resource 1. An SRS resource for which power is to be adjusted and that corresponds to the second index value is the SRS resource 2. In this case, when receiving an index of the SRS resource in the SRI, the terminal device may determine both the SRS resource and an SRS resource for which power is to be adjusted. This reduces the signaling overheads of the transmit power control indication information. It should be understood that the terminal device sends physical uplink shared channel PUSCH data based on the SRI means that in a codebook-based uplink transmission mode, the terminal device determines a corresponding SRS resource based on an index of the SRI information, the terminal device uses a transmit antenna corresponding to the SRS resource on the SRS resource, and the terminal device sends the PUSCH data by using the transmit antenna. In a non-codebook-based uplink transmission mode, the terminal device determines the number of PUSCH transmission layers based on a number of SRS resources indicated by the SRI information, and determines a corresponding SRS resource based on an index of the SRI information. One SRS resource corresponds to one precoding matrix. The precoding matrix represents amplitude and phase information between transmit antennas. The terminal device performs PUSCH transmission based on the precoding matrix.

In a possible implementation, the first index value set includes the first index value, the second index value, and a third index value. A number of SRS resources corresponding to the third index value is 1, or an SRS resource corresponding to the third index value belongs to one SRS resource set.

With reference to the first aspect, in some implementations of the first aspect, the method includes: The terminal device receives the SRS resource indication SRI. The index value included in the SRI belongs to the first index value set. The first index value set includes the first index value and the second index value. The first index value and the second index value correspond to the plurality of same SRS resources. The SRS resources corresponding to both the first index value and the second index value belong to the plurality of SRS resource sets. The terminal device sends the PUSCH based on the SRI.

In this embodiment of this application, a mapping order between the SRS resource/SRS resource set and different PUSCH time-frequency resources may be flexibly indicated by using the first index value and the second index value, and DCI overheads are not increased.

With reference to the first aspect, in some implementations of the first aspect, the index value is the first index value or the second index value, and the method further includes: The terminal device receives transmit power control TPC indication information. The TPC indication information is used to adjust transmit power of PUSCH transmission corresponding to the first SRS resource set in the plurality of SRS resource sets. The first SRS resource set is one of the plurality of SRS resource sets. The terminal device determines the first SRS resource set based on the SRI. The first index value and the second index value correspond to different first SRS resource sets.

Currently, when the terminal device determines to send uplink data to a plurality of TRPs, the terminal device needs to multiply, based on a number of TRPs, signaling overheads of TPC indication information. In this embodiment of this application, a remaining bit in an SRI field are used, so that two index values correspond to a plurality of same SRS resources. The two index values correspond to different SRS resource sets for which power is to be adjusted, so that each index value may indicate both an SRS resource and an SRS resource set of to-be-adjusted power. This reduces the signaling overheads of the TPC indication information. For example, both the first index value and the second index value correspond to an SRS resource 1 and an SRS resource 2. The SRS resource 1 belongs to a first SRS resource set and corresponds to a first TRP data transmission channel. An SRS resource for which power is to be adjusted and that corresponds to the first index value is the SRS resource 1. An SRS resource for which power is to be adjusted and that corresponds to the second index value is the SRS resource 2. In this case, when receiving an index of the SRS resource in the SRI, the terminal device may determine both the SRS resource and an SRS resource for which power is to be adjusted. This reduces the signaling overheads of the TPC indication information.

With reference to the first aspect, in some implementations of the first aspect, the method further includes: The first index value and the second index value correspond to different $1^{st}$ SRS resources. The $1^{st}$ SRS resource is an SRS resource ranked the first in the first SRS resource set.

In this embodiment of this application, the first index value and the second index value correspond to the plurality of same SRS resources. However, ranks of the SRS resources sets are different, in other words, $1^{st}$ SRS resources are different. The order (or the $1^{st}$ SRS resource of each of the first index value and the second index value) may indicate other information, for example, an SRS resource on which the TPC acts.

With reference to the first aspect, in some implementations of the first aspect, the method further includes: The plurality of SRS resource sets further include a second SRS resource set. The first SRS resource set and the second SRS resource set correspond to different time domain elements of the PUSCH.

In this embodiment of this application, different SRS resource sets correspond to different TRP transmission channels. The terminal device sends, on different time domain units, frequency domain units, or space units, PUSCH data corresponding to the different SRS resource sets.

With reference to the first aspect, in some implementations of the first aspect, the method further includes: The terminal device determines group information corresponding to a third index value in the first index value set, where a number of SRS resource sets corresponding to the third index value is 1. The terminal device determines, based on the group information corresponding to the third index value, group information corresponding to a fourth index value in the first index value set, where a number of SRS resource sets corresponding to the fourth index value is greater than 1. The terminal device determines the transmit power of the PUSCH based on the group information.

Optionally, in this embodiment, the SRI information may include only one of the first index value or the second index value.

In this embodiment of this application, the group information corresponding to the fourth index value is associated with the group information corresponding to the third index value. This can simplify configuration signaling of the group information of the fourth index value. In addition, independent power of each TRP can be accumulated, to improve uplink transmission energy efficiency.

With reference to the first aspect, in some implementations of the first aspect, the method includes: SRS resources corresponding to the fourth index value include SRS resources that belong to the first SRS resource set and the second SRS resource set. The terminal device separately determines group information corresponding to an SRS resource belonging to the first SRS resource set and group information corresponding to an SRS resource belonging to the second SRS resource set.

With reference to the first aspect, in some implementations of the first aspect, the method includes: The SRS resources corresponding to the fourth index value include a first SRS resource. The first SRS resource and a second SRS resource corresponding to the third index value belong to a same SRS resource set. Group information corresponding to the first SRS resource is the same as the group information corresponding to the third index value.

In this embodiment of this application, the first SRS resource corresponding to the fourth index value and the second SRS resource corresponding to the third index value belong to the same SRS resource set, so that the group information corresponding to the first SRS resource is the same as the group information corresponding to the third index value. This can simplify configuration signaling of the group information of the terminal device.

According to a second aspect, an indication method is provided. The method includes: A radio access network device determines a sounding reference signal SRS resource indication SRI. An index value included in the SRI belongs to a first index value set. The first index value set includes a first index value and a second index value. The first index value and the second index value correspond to a plurality of same SRS resources. The SRS resources corresponding to both the first index value and the second index value belong to a plurality of SRS resource sets. The first index value and the second index value correspond to different SRS resource sets for which power is to be adjusted. The SRI indicates a terminal device to send physical uplink shared channel PUSCH data. The radio access network device sends the SRI.

Currently, when a terminal device sends uplink data to a plurality of TRPs, the radio access network device needs to multiply, based on a number of TRPs, signaling overheads of transmit power control indication information. In this embodiment of this application, a remaining bit in an SRI field are used, so that two index values correspond to a plurality of same SRS resources. The two index values correspond to different SRS resource sets for which power is to be adjusted, so that each index value may indicate both an SRS resource and an SRS resource set of to-be-adjusted power. This reduces the signaling overheads of the transmit power control indication information. For example, both the first index value and the second index value correspond to an SRS resource 1 and an SRS resource 2. The SRS resource 1 belongs to a first SRS resource set and corresponds to a first TRP data transmission channel. An SRS resource for which power is to be adjusted and that corresponds to the first index value is the SRS resource 1. An SRS resource for which power is to be adjusted and that corresponds to the second index value is the SRS resource 2. In this case, when sending an index of the SRS resource in the SRI, the radio access network device may indicate both the SRS resource and an SRS resource for which power is to be adjusted. This reduces the signaling overheads of the transmit power control indication information. It should be understood that the SRI indicates a terminal device to send physical uplink shared channel PUSCH data means that in a codebook-based uplink transmission mode, the terminal device determines a corresponding SRS resource based on an index of the SRI information, the terminal device uses a transmit antenna corresponding to the SRS resource on the SRS resource, and the terminal device sends the PUSCH data by using the transmit antenna. In a non-codebook-based uplink transmission mode, the terminal device determines the number of PUSCH transmission layers based on a number of SRS resources indicated by the SRI information, and determines a corresponding SRS resource based on an index of the SRI information. One SRS resource corresponds to one precoding matrix. The precoding matrix represents amplitude and phase information between transmit antennas. The terminal device performs PUSCH transmission based on the precoding matrix.

In a possible implementation, the first index value set includes the first index value, the second index value, and a third index value. A number of SRS resources corresponding to the third index value is 1, or an SRS resource corresponding to the third index value belongs to one SRS resource set.

With reference to the second aspect, in some implementations of the second aspect, the method includes: The radio access network device receives the SRS resource indication SRI. The index value included in the SRI belongs to the first index value set. The first index value set includes the first index value and the second index value. The first index value and the second index value correspond to the plurality of same SRS resources. The SRS resources corresponding to both the first index value and the second index value belong to the plurality of SRS resource sets. The SRI indicates the terminal device to send the physical uplink shared channel PUSCH data. The radio access network device sends the SRI.

In this embodiment of this application, a mapping order between the SRS resource/SRS resource set and different PUSCH time-frequency resources may be flexibly indicated by using the first index value and the second index value, and DCI overheads are not increased.

With reference to the second aspect, in some implementations of the second aspect, the method includes: The radio access network device determines transmit power control TPC indication information. The TPC indication information is used to adjust transmit power of PUSCH transmission corresponding to a first SRS resource set in the plurality of SRS resource sets. The first SRS resource set is one of the plurality of SRS resource sets. The index value is the first index value or the second index value. The first index value and the second index value correspond to different first SRS resource sets. The radio access network device determines the first SRS resource set, and determines the SRI based on the first SRS resource set. The radio access network device sends the TPC indication information.

Currently, when the terminal device sends uplink data to a plurality of TRPs, the radio access network device needs to multiply, based on a number of TRPs, signaling overheads of TPC indication information. In this embodiment of this application, a remaining bit in an SRI field are used, so that two index values correspond to a plurality of same SRS resources. The two index values correspond to different SRS resource sets for which power is to be adjusted, so that each index value may indicate both an SRS resource and an SRS resource set of to-be-adjusted power. This reduces the signaling overheads of the TPC indication information. For example, both the first index value and the second index value correspond to an SRS resource 1 and an SRS resource 2. The SRS resource 1 belongs to a first SRS resource set and corresponds to a first TRP data transmission channel. An SRS resource for which power is to be adjusted and that corresponds to the first index value is the SRS resource 1. An SRS resource for which power is to be adjusted and that corresponds to the second index value is the SRS resource 2. In this case, when sending an index of the SRS resource in the SRI, the radio access network device may indicate both the SRS resource and an SRS resource for which power is to be adjusted. This reduces the signaling overheads of the TPC indication information. It should be understood that the SRI indicates a terminal device to send physical uplink shared channel PUSCH data means that in a codebook-based uplink transmission mode, the terminal device determines a corresponding SRS resource based on an index of the SRI information, the terminal device uses a transmit antenna corresponding to the SRS resource on the SRS resource, and the terminal device sends the PUSCH data by using the transmit antenna. In a non-codebook-based uplink transmission mode, the terminal device determines the number of PUSCH transmission layers based on a number of SRS resources indicated by the SRI information, and determines a corresponding SRS resource based on an index of the SRI information. One SRS resource corresponds to one precoding matrix. The precoding matrix represents amplitude and phase information between transmit antennas. The terminal device performs PUSCH transmission based on the precoding matrix.

With reference to the second aspect, in some implementations of the second aspect, the method further includes: The first index value and the second index value correspond to different $1^{st}$ SRS resources. The $1^{st}$ SRS resource is an SRS resource ranked the first in the first SRS resource set.

In this embodiment of this application, the first index value and the second index value correspond to the plurality of same SRS resources. However, ranks of the SRS resources sets are different, in other words, $1^{st}$ SRS resources are different. The order (or the $1^{st}$ SRS resource of each of the first index value and the second index value) may indicate other information, for example, an SRS resource on which the TPC acts.

With reference to the second aspect, in some implementations of the second aspect, the method further includes: The plurality of SRS resource sets further include a second SRS resource set. The first SRS resource set and the second SRS resource set correspond to different time domain elements of the PUSCH.

In this embodiment of this application, different SRS resource sets correspond to different TRP transmission channels. The terminal device sends, on different time domain units, frequency domain units, or space units, PUSCH data corresponding to the different SRS resource sets.

With reference to the second aspect, in some implementations of the second aspect, the method further includes: The radio access network device determines group information corresponding to a third index value in the first index value set, where a number of SRS resource sets corresponding to the third index value is 1. The radio access network device determines, based on the group information corresponding to the third index value, group information corresponding to a fourth index value in the first index value set, where a number of SRS resource sets corresponding to the fourth index value is greater than 1. The radio access network device determines the transmit power of the PUSCH based on the group information.

In this embodiment of this application, the group information corresponding to the fourth index value is associated with the group information corresponding to the third index value. This can simplify configuration signaling of the group information of the fourth index value.

With reference to the second aspect, in some implementations of the second aspect, the method includes: SRS resources corresponding to the fourth index value include SRS resources that belong to the first SRS resource set and the second SRS resource set. The radio access network device separately determines group information corresponding to an SRS resource belonging to the first SRS resource set and group information corresponding to an SRS resource belonging to the second SRS resource set.

With reference to the second aspect, in some implementations of the second aspect, the method includes: The SRS resources corresponding to the fourth index value include a first SRS resource. The first SRS resource and a second SRS resource corresponding to the third index value belong to a same SRS resource set. Group information corresponding to the first SRS resource is the same as the group information corresponding to the third index value.

In this embodiment of this application, the first SRS resource corresponding to the fourth index value and the second SRS resource corresponding to the third index value belong to the same SRS resource set, so that the group information corresponding to the first SRS resource is the same as the group information corresponding to the third index value. This can simplify configuration signaling of the group information of the radio access network device.

According to a third aspect, a terminal device is provided. The terminal device includes: a receiving unit, configured to receive a sounding reference signal SRS resource indication SRI, where an index value included in the SRI belongs to a first index value set, the first index value set includes a first index value and a second index value, the first index value and the second index value correspond to a plurality of same SRS resources, the SRS resources corresponding to both the first index value and the second index value belong to a plurality of SRS resource sets, and the first index value and the second index value correspond to different SRS resource sets for which power is to be adjusted; and a sending unit, configured to send physical uplink shared channel PUSCH data based on the SRI.

Currently, when the terminal device sends uplink data to a plurality of TRPs, the terminal device needs to multiply, based on a number of TRPs, signaling overheads of transmit power control indication information. In this embodiment of this application, a remaining bit in an SRI field are used, so that two index values correspond to a plurality of same SRS resources. The two index values correspond to different SRS resource sets for which power is to be adjusted, so that each index value may indicate both an SRS resource and an SRS resource set of to-be-adjusted power. This reduces the signaling overheads of the transmit power control indication information. For example, both the first index value and the second index value correspond to an SRS resource 1 and an SRS resource 2. The SRS resource 1 belongs to a first SRS resource set and corresponds to a first TRP data transmission channel. An SRS resource for which power is to be adjusted and that corresponds to the first index value is the SRS resource 1. An SRS resource for which power is to be adjusted and that corresponds to the second index value is the SRS resource 2. In this case, when receiving an index of the SRS resource in the SRI, the terminal device may determine both the SRS resource and an SRS resource for which power is to be adjusted. This reduces the signaling overheads of the transmit power control indication information. It should be understood that the terminal device sends physical uplink shared channel PUSCH data based on the SRI means that in a codebook-based uplink transmission mode, the terminal device determines a corresponding SRS resource based on an index of the SRI information, the terminal device uses a transmit antenna corresponding to the SRS resource on the SRS resource, and the terminal device sends the PUSCH data by using the transmit antenna. In a non-codebook-based uplink transmission mode, the terminal device determines the number of PUSCH transmission layers based on a number of SRS resources indicated by the SRI information, and determines a corresponding SRS resource based on an index of the SRI information. One SRS resource corresponds to one precoding matrix. The precoding matrix represents amplitude and phase information between transmit antennas. The terminal device performs PUSCH transmission based on the precoding matrix.

In a possible implementation, the first index value set includes the first index value, the second index value, and a third index value. A number of SRS resources corresponding to the third index value is 1, or an SRS resource corresponding to the third index value belongs to one SRS resource set.

With reference to the third aspect, in some implementations of the third aspect, the receiving unit is configured to receive the sounding reference signal SRS resource indication SRI, where the index value included in the SRI belongs to the first index value set, the first index value set includes the first index value and the second index value, the first index value and the second index value correspond to the plurality of same SRS resources, and the SRS resources corresponding to both the first index value and the second index value belong to the plurality of SRS resource sets; and the sending unit is configured to send the PUSCH based on the SRI.

In this embodiment of this application, a mapping order between the SRS resource/SRS resource set and different PUSCH time-frequency resources may be flexibly indicated by using the first index value and the second index value, and DCI overheads are not increased.

With reference to the third aspect, in some implementations of the third aspect, the index value is the first index value or the second index value. The receiving unit is further configured to receive transmit power control TPC indication information, where the TPC indication information is used to adjust transmit power of PUSCH transmission corresponding to the first SRS resource set in the plurality of SRS resource sets, and the first SRS resource set is one of the plurality of SRS resource sets. The terminal device further includes a processing unit, configured to determine the first SRS resource set based on the SRI, where the first index value and the second index value correspond to different first SRS resource sets.

Currently, when the terminal device determines to send uplink data to a plurality of TRPs, the terminal device needs to multiply, based on a number of TRPs, signaling overheads of TPC indication information. In this embodiment of this application, a remaining bit in an SRI field are used, so that two index values correspond to a plurality of same SRS resources. The two index values correspond to different SRS resource sets for which power is to be adjusted, so that each index value may indicate both an SRS resource and an SRS resource set of to-be-adjusted power. This reduces the signaling overheads of the TPC indication information. For example, both the first index value and the second index value correspond to an SRS resource 1 and an SRS resource 2. The SRS resource 1 belongs to a first SRS resource set and corresponds to a first TRP data transmission channel. An SRS resource for which power is to be adjusted and that corresponds to the first index value is the SRS resource 1. An SRS resource for which power is to be adjusted and that corresponds to the second index value is the SRS resource 2. In this case, when receiving an index of the SRS resource in the SRI, the terminal device may determine both the SRS resource and an SRS resource for which power is to be adjusted. This reduces the signaling overheads of the TPC indication information.

With reference to the third aspect, in some implementations of the third aspect, the terminal device further includes: The first index value and the second index value correspond to different $1^{st}$ SRS resources. The $1^{st}$ SRS resource is an SRS resource ranked the first in the first SRS resource set.

In this embodiment of this application, the first index value and the second index value correspond to the plurality of same SRS resources. However, ranks of the SRS resources sets are different, in other words, $1^{st}$ SRS resources are different. The order (or the $1^{st}$ SRS resource of each of the first index value and the second index value) may indicate other information, for example, an SRS resource on which the TPC acts.

With reference to the third aspect, in some implementations of the third aspect, the terminal device further includes: The plurality of SRS resource sets further include a second SRS resource set. The first SRS resource set and the second SRS resource set correspond to different time domain elements of the PUSCH.

In this embodiment of this application, different SRS resource sets correspond to different TRP transmission channels. The terminal device sends, on different time domain units, frequency domain units, or space units, PUSCH data corresponding to the different SRS resource sets.

With reference to the third aspect, in some implementations of the third aspect, the terminal device further includes: The processing unit is further configured to determine group information corresponding to a third index value in the first index value set, where a number of SRS resource sets corresponding to the third index value is 1. The processing unit determines, based on the group information corresponding to the third index value, group information corresponding to a fourth index value in the first index value set, where a number of SRS resource sets corresponding to the fourth index value is greater than 1. The processing unit determines the transmit power of the PUSCH based on the group information.

In this embodiment of this application, the group information corresponding to the fourth index value is associated with the group information corresponding to the third index value. This can simplify configuration signaling of the group information of the fourth index value.

With reference to the third aspect, in some implementations of the third aspect, the terminal device includes: SRS resources corresponding to the fourth index value include SRS resources that belong to the first SRS resource set and the second SRS resource set. The processing unit is further configured to separately determine group information corresponding to an SRS resource belonging to the first SRS resource set and group information corresponding to an SRS resource belonging to the second SRS resource set.

With reference to the third aspect, in some implementations of the third aspect, the terminal device includes: The SRS resources corresponding to the fourth index value include a first SRS resource. The first SRS resource and a second SRS resource corresponding to the third index value belong to a same SRS resource set. Group information corresponding to the first SRS resource is the same as the group information corresponding to the third index value.

In this embodiment of this application, the first SRS resource corresponding to the fourth index value and the second SRS resource corresponding to the third index value belong to the same SRS resource set, so that the group information corresponding to the first SRS resource is the same as the group information corresponding to the third index value. This can simplify configuration signaling of the group information of the terminal device.

According to a fourth aspect, a radio access network device is provided. The radio access network device includes: a processing unit, configured to determine an SRS resource indication SRI, where an index value included in the SRI belongs to a first index value set, the first index value set includes a first index value and a second index value, the first index value and the second index value correspond to a plurality of same SRS resources, the SRS resources corresponding to both the first index value and the second index value belong to a plurality of SRS resource sets, the first index value and the second index value correspond to different SRS resource sets for which power is to be adjusted, and the SRI indicates a terminal device to send physical uplink shared channel PUSCH data; and a sending unit, configured to send the SRI.

Currently, when a terminal device sends uplink data to a plurality of TRPs, the radio access network device needs to multiply, based on a number of TRPs, signaling overheads of transmit power control indication information. In this embodiment of this application, a remaining bit in an SRI field are used, so that two index values correspond to a plurality of same SRS resources. The two index values correspond to different SRS resource sets for which power is to be adjusted, so that each index value may indicate both an SRS resource and an SRS resource set of to-be-adjusted power. This reduces the signaling overheads of the transmit power control indication information. For example, both the first index value and the second index value correspond to an SRS resource 1 and an SRS resource 2. The SRS resource 1 belongs to a first SRS resource set and corresponds to a first TRP data transmission channel. An SRS resource for which power is to be adjusted and that corresponds to the first index value is the SRS resource 1. An SRS resource for which power is to be adjusted and that corresponds to the second index value is the SRS resource 2. In this case, when sending an index of the SRS resource in the SRI, the radio access network device may indicate both the SRS resource and an SRS resource for which power is to be adjusted. This reduces the signaling overheads of the transmit power control indication information. It should be understood that the SRI indicates a terminal device to send physical uplink shared channel PUSCH data means that in a codebook-based uplink transmission mode, the terminal device determines a corresponding SRS resource based on an index of the SRI information, the terminal device uses a transmit antenna corresponding to the SRS resource on the SRS resource, and the terminal device sends the PUSCH data by using the transmit antenna. In a non-codebook-based uplink transmission mode, the terminal device determines the number of PUSCH transmission layers based on a number of SRS resources indicated by the SRI information, and determines a corresponding SRS resource based on an index of the SRI information. One SRS resource corresponds to one precoding matrix. The precoding matrix represents amplitude and phase information between transmit antennas. The terminal device performs PUSCH transmission based on the precoding matrix.

In a possible implementation, the first index value set includes the first index value, the second index value, and a third index value. A number of SRS resources corresponding to the third index value is 1, or an SRS resource corresponding to the third index value belongs to one SRS resource set.

With reference to the fourth aspect, in some implementations of the fourth aspect, the processing unit is configured to determine the SRS resource indication SRI, where the index value included in the SRI belongs to the first index value set, the first index value set includes the first index value and the second index value, the first index value and the second index value correspond to the plurality of same SRS resources, the SRS resources corresponding to both the first index value and the second index value belong to the plurality of SRS resource sets, and the SRI indicates the terminal device to send the physical uplink shared channel PUSCH data; and the sending unit is configured to send the SRI.

In this embodiment of this application, a mapping order between the SRS resource/SRS resource set and different PUSCH time-frequency resources may be flexibly indicated by using the first index value and the second index value, and DCI overheads are not increased.

With reference to the fourth aspect, in some implementations of the fourth aspect, the processing unit is further configured to determine transmit power control TPC indication information, where the TPC indication information is used to adjust transmit power of PUSCH transmission corresponding to a first SRS resource set in the plurality of SRS resource sets, the first SRS resource set is one of the plurality of SRS resource sets, the index value is the first index value or the second index value, and the first index value and the second index value correspond to different first SRS resource sets; the processing unit determines the first SRS resource set, and determines the SRI based on the first SRS resource set; and the sending unit sends the TPC indication information.

Currently, when the terminal device sends uplink data to a plurality of TRPs, the radio access network device needs to multiply, based on a number of TRPs, signaling overheads of TPC indication information. In this embodiment of this application, a remaining bit in an SRI field are used, so that two index values correspond to a plurality of same SRS resources. The two index values correspond to different SRS resource sets for which power is to be adjusted, so that each index value may indicate both an SRS resource and an SRS resource set of to-be-adjusted power. This reduces the signaling overheads of the TPC indication information. For example, both the first index value and the second index value correspond to an SRS resource 1 and an SRS resource 2. The SRS resource 1 belongs to a first SRS resource set and corresponds to a first TRP data transmission channel. An SRS resource for which power is to be adjusted and that corresponds to the first index value is the SRS resource 1. An SRS resource for which power is to be adjusted and that corresponds to the second index value is the SRS resource 2. In this case, when sending an index of the SRS resource in the SRI, the radio access network device may indicate both the SRS resource and an SRS resource for which power is to be adjusted. This reduces the signaling overheads of the TPC indication information. It should be understood that the SRI indicates a terminal device to send physical uplink shared channel PUSCH data means that in a codebook-based uplink transmission mode, the terminal device determines a corresponding SRS resource based on an index of the SRI information, the terminal device uses a transmit antenna corresponding to the SRS resource on the SRS resource, and the terminal device sends the PUSCH data by using the transmit antenna. In a non-codebook-based uplink transmission mode, the terminal device determines the number of PUSCH transmission layers based on a number of SRS resources indicated by the SRI information, and determines a corresponding SRS resource based on an index of the SRI information. One SRS resource corresponds to one precoding matrix. The precoding matrix represents amplitude and phase information between transmit antennas. The terminal device performs PUSCH transmission based on the precoding matrix.

With reference to the fourth aspect, in some implementations of the fourth aspect, the radio access network device further includes: The first index value and the second index value correspond to different $1^{st}$ SRS resources. The $1^{st}$ SRS resource is an SRS resource ranked the first in the first SRS resource set.

In this embodiment of this application, the first index value and the second index value correspond to the plurality of same SRS resources. However, ranks of the SRS resources sets are different, in other words, $1^{st}$ SRS resources are different. The order (or the $1^{st}$ SRS resource of each of the first index value and the second index value) may indicate other information, for example, an SRS resource on which the TPC acts.

With reference to the fourth aspect, in some implementations of the fourth aspect, the radio access network device further includes: The plurality of SRS resource sets further include a second SRS resource set. The first SRS resource set and the second SRS resource set correspond to different time domain elements of the PUSCH.

In this embodiment of this application, different SRS resource sets correspond to different TRP transmission channels. The terminal device sends, on different time domain units, frequency domain units, or space units, PUSCH data corresponding to the different SRS resource sets.

With reference to the fourth aspect, in some implementations of the fourth aspect, the radio access network device further includes: The processing unit determines group information corresponding to a third index value in the first index value set, where a number of SRS resource sets corresponding to the third index value is 1. The processing unit determines, based on the group information corresponding to the third index value, group information corresponding to a fourth index value in the first index value set, where a number of SRS resource sets corresponding to the fourth index value is greater than 1. The processing unit determines the transmit power of the PUSCH based on the group information.

In this embodiment of this application, the group information corresponding to the fourth index value is associated with the group information corresponding to the third index value. This can simplify configuration signaling of the group information of the fourth index value.

With reference to the fourth aspect, in some implementations of the fourth aspect, the radio access network device includes: SRS resources corresponding to the fourth index value include SRS resources that belong to the first SRS resource set and the second SRS resource set. The processing unit is further configured to separately determine group information corresponding to an SRS resource belonging to the first SRS resource set and group information corresponding to an SRS resource belonging to the second SRS resource set.

With reference to the fourth aspect, in some implementations of the fourth aspect, the radio access network device includes: The SRS resources corresponding to the fourth index value include a first SRS resource. The first SRS resource and a second SRS resource corresponding to the third index value belong to a same SRS resource set. Group information corresponding to the first SRS resource is the same as the group information corresponding to the third index value.

In this embodiment of this application, the first SRS resource corresponding to the fourth index value and the second SRS resource corresponding to the third index value belong to the same SRS resource set, so that the group information corresponding to the first SRS resource is the same as the group information corresponding to the third index value. This can simplify configuration signaling of the group information of the radio access network device.

According to the fifth aspect, a computer-readable storage medium is provided. The computer-readable storage medium stores a computer program. When the computer program is run, an apparatus is enabled to perform an instruction of the method according to any one of the first aspect or the possible implementations of the first aspect, or is enabled to perform an instruction of the method according to any one of the second aspect or the possible implementations of the second aspect.

According to the sixth aspect, a chip system is provided. The chip system includes a processor, configured to: invoke a computer program from a memory and run the computer program, so that a communication apparatus provided with the chip system is installed performs the method according to any one of the first aspect or the possible implementations of the first aspect; or performs the method according to any one of the second aspect or the possible implementations of the second aspect.

According to the seventh aspect, a communication system is provided. The communication system includes: a first terminal device, configured to perform the method according to any one of the first aspect or the possible implementations of the first aspect; and a first radio access network device, configured to perform the method according to any one of the second aspect or the possible implementations of the second aspect.

According to the eighth aspect, a wireless communication apparatus is provided. The wireless communication apparatus includes: a unit, configured to perform the method according to any one of the first aspect or the possible implementations of the first aspect or perform the method according to any one of the second aspect or the possible implementations of the second aspect.

According to the ninth aspect, a computer program product is provided. The computer program product includes computer program code. When the computer program code is run by a terminal device, the terminal device is enabled to perform the method in any one of the first aspect or the possible implementations of the first aspect.

According to the tenth aspect, a computer program product is provided. The computer program product includes computer program code. When the computer program code is run by a radio access network device, the radio access network device is enabled to perform the method in any one of the second aspect or the possible implementations of the second aspect.

According to the eleventh aspect, an indication method is provided. The method includes: A terminal device receives first indication information. The first indication information indicates a number of transmission layers of a physical uplink shared channel PUSCH and precoding information. The precoding information includes information about two precoding matrices. Dimensions of the two precoding matrices are the same. Numbers of non-zero elements in a same column of the two precoding matrices are the same. The terminal device sends physical uplink shared channel PUSCH data based on the first indication information.

This embodiment of this application may be applied to a scenario in which the terminal device sends data to a plurality of TRPs, for example, a scenario in which the terminal device sends data to two TRPs. Currently, a size of a bit field in which an index value that indicates a number of transmission layers and a TPMI index is located is a size of a bit field when all TPMIs are pairwise combined. In this embodiment of this application, dimensions of precoding matrices that are indicated by the pairwise combined TPMIs are the same, and the numbers of non-zero elements in the same column of the two precoding matrices are the same. This reduces a number of combinations of the pairwise combined TPMIs, reduces the size of the bit field in which the index value that indicates the number of transmission layers and the TPMI index is located, and reduces signaling overheads of the bit field.

With reference to the eleventh aspect, in some implementations of the eleventh aspect, locations of the non-zero elements in the same column of the two precoding matrices are the same.

In this embodiment of this application, a feature of the two precoding matrices is further limited, that is, the locations of the non-zero elements in the same column of the two precoding matrices are the same. This further reduces the size of the bit field in which the index value that indicates the number of transmission layers and the TPMI index is located, and reduces signaling overheads of the bit field.

With reference to the eleventh aspect, in some implementations of the eleventh aspect, that the terminal device sends PUSCH data based on the first indication information includes: The two precoding matrices include a first precoding matrix and a second precoding matrix. The first precoding matrix corresponds to a first time-frequency resource occupied by the PUSCH data. The second precoding matrix corresponds to a second time-frequency resource occupied by the PUSCH data. The first time-frequency resource does not overlap with the second time-frequency resource. The terminal device sends the PUSCH data on the first time-frequency resource and the second time-frequency resource.

According to a twelfth aspect, an indication method is provided. The method includes: A radio access network device determines first indication information. The first indication information indicates a number of transmission layers of a physical uplink shared channel PUSCH and precoding information. The precoding information includes information about two precoding matrices. Dimensions of the two precoding matrices are the same. Numbers of non-zero elements in a same column of the two precoding matrices are the same. The radio access network device sends the first indication information.

This embodiment of this application may be applied to a scenario in which a terminal device sends data to a plurality of TRPs, for example, a scenario in which the terminal device sends data to two TRPs. Currently, a size of a bit field in which an index value that is sent by the radio access network device to the terminal device and that indicates a number of transmission layers and a TPMI index is located is a size of a bit field when all TPMIs are pairwise combined. In this embodiment of this application, dimensions of precoding matrices that are indicated by the pairwise combined TPMIs are the same, and the numbers of non-zero elements in the same column of the two precoding matrices are the same. This reduces a number of combinations of the pairwise combined TPMIs, reduces the size of the bit field in which the index value that indicates the number of transmission layers and the TPMI index is located, and reduces signaling overheads of the bit field.

With reference to the twelfth aspect, in some implementations of the twelfth aspect, locations of the non-zero elements in the same column of the two precoding matrices are the same.

In this embodiment of this application, a feature of the two precoding matrices is further limited, that is, the locations of the non-zero elements in the same column of the two precoding matrices are the same. This further reduces the size of the bit field in which the index value that indicates the number of transmission layers and the TPMI index is located, and reduces signaling overheads of the bit field.

According to a thirteenth aspect, a terminal device is provided. The terminal device includes: a receiving unit is configured to receive first indication information, where the first indication information indicates a number of transmission layers of a physical uplink shared channel PUSCH and precoding information, the precoding information includes information about two precoding matrices, dimensions of the two precoding matrices are the same, and numbers of non-zero elements in a same column of the two precoding matrices are the same; and a sending unit, configured to send physical uplink shared channel PUSCH data based on the first indication information.

This embodiment of this application may be applied to a scenario in which the terminal device sends data to a plurality of TRPs, for example, a scenario in which the terminal device sends data to two TRPs. Currently, a size of a bit field in which an index value that indicates a number of transmission layers and a TPMI index is located is a size of a bit field when all TPMIs are pairwise combined. In this embodiment of this application, dimensions of precoding matrices that are indicated by the pairwise combined TPMIs are the same, and the numbers of non-zero elements in the same column of the two precoding matrices are the same. This reduces a number of combinations of the pairwise combined TPMIs, reduces the size of the bit field in which the index value that indicates the number of transmission layers and the TPMI index is located, and reduces signaling overheads of the bit field.

With reference to the thirteenth aspect, in some implementations of the thirteenth aspect, locations of the non-zero elements in the same column of the two precoding matrices are the same.

In this embodiment of this application, a feature of the two precoding matrices is further limited, that is, the locations of the non-zero elements in the same column of the two precoding matrices are the same. This further reduces the size of the bit field in which the index value that indicates the number of transmission layers and the TPMI index is located, and reduces signaling overheads of the bit field.

With reference to the thirteenth aspect, in some implementations of the thirteenth aspect, that the sending unit sends PUSCH data based on the first indication information includes: The two precoding matrices include a first precoding matrix and a second precoding matrix. The first precoding matrix corresponds to a first time-frequency resource occupied by the PUSCH data. The second precoding matrix corresponds to a second time-frequency resource occupied by the PUSCH data. The first time-frequency resource does not overlap with the second time-frequency resource. The sending unit sends the PUSCH data on the first time-frequency resource and the second time-frequency resource.

According to a fourteenth aspect, a radio access network device is provided. The radio access network device includes: a processing unit, configured to determine first indication information, the first indication information indicates a number of transmission layers of a physical uplink shared channel PUSCH and precoding information, the precoding information includes information about two precoding matrices, dimensions of the two precoding matrices are the same; and numbers of non-zero elements in a same column of the two precoding matrices are the same; and a sending unit, configured to send the first indication information.

This embodiment of this application may be applied to a scenario in which a terminal device sends data to a plurality of TRPs, for example, a scenario in which the terminal device sends data to two TRPs. Currently, a size of a bit field in which an index value that is sent by the radio access network device to the terminal device and that indicates a number of transmission layers and a TPMI index is located is a size of a bit field when all TPMIs are pairwise combined. In this embodiment of this application, dimensions of precoding matrices that are indicated by the pairwise combined TPMIs are the same, and the numbers of non-zero elements in the same column of the two precoding matrices are the same. This reduces a number of combinations of the pairwise combined TPMIs, reduces the size of the bit field in which the index value that indicates the number of transmission layers and the TPMI index is located, and reduces signaling overheads of the bit field.

With reference to the fourteenth aspect, in some implementations of the fourteenth aspect, locations of the non-zero elements in the same column of the two precoding matrices are the same.

In this embodiment of this application, a feature of the two precoding matrices is further limited, that is, the locations of the non-zero elements in the same column of the two precoding matrices are the same. This further reduces the size of the bit field in which the index value that indicates the number of transmission layers and the TPMI index is located, and reduces signaling overheads of the bit field.

According to a fifteenth aspect, a computer-readable storage medium is provided. The computer-readable storage medium stores a computer program. When the computer program is run, an apparatus is enabled to perform an instruction of the method according to any one of the eleventh aspect or the possible implementations of the eleventh aspect, or is enabled to perform an instruction of the method according to any one of the twelfth aspect or the possible implementations of the twelfth aspect.

According to the sixteenth aspect, a chip system is provided. The chip system includes a processor, configured to: invoke a computer program from a memory and run the computer program, so that a communication apparatus provided with the chip system is installed performs the method according to any one of the eleventh aspect or the possible implementations of the eleventh aspect; or performs the method according to any one of the twelfth aspect or the possible implementations of the twelfth aspect.

According to the seventeenth aspect, a communication system is provided. The communication system includes: a first terminal device, configured to perform the method according to any one of the eleventh aspect or the possible implementations of the eleventh aspect; and a first radio access network device, configured to perform the method according to any one of the twelfth aspect or the possible implementations of the twelfth aspect.

According to the eighteenth aspect, a wireless communication apparatus is provided. The wireless communication apparatus includes: a unit, configured to perform the method according to any one of the eleventh aspect or the possible implementations of the eleventh aspect or perform the method according to any one of the twelfth aspect or the possible implementations of the twelfth aspect.

According to the nineteenth aspect, a computer program product is provided. The computer program product includes computer program code. When the computer program code is run by a terminal device, the terminal device is enabled to perform the method in any one of the eleventh aspect or the possible implementations of the eleventh aspect.

According to the twentieth aspect, a computer program product is provided. The computer program product includes computer program code. When the computer program code is run by a radio access network device, the radio access network device is enabled to perform the method in any one of the twelfth aspect or the possible implementations of the twelfth aspect.

According to the twenty-first aspect, an indication method is provided. The method includes: A terminal device receives first indication information, where the first indication information indicates a first transmit power control TPC adjustment amount. The terminal device receives second indication information, where the second indication information indicates at least one the first sounding reference signal SRS resource and indicates a second SRS resource on which the first TPC adjustment amount acts. The second SRS resource is at least one resource in the first SRS resource. The terminal device sends first data on the first SRS resource, and adjusts, based on the first TPC adjustment amount, power corresponding to the second SRS resource.

Currently, when the terminal device determines to send uplink data to a plurality of TRPs, the terminal device needs to multiply, based on a number of TRPs, signaling overheads of TPC indication information. In this embodiment of this application, a remaining bit in an SRI field are used, so that the second indication information may indicate the first SRS resource for sending uplink data, and indicate the second SRS resource on which the TPC adjustment amount acts (which means that the TPC adjustment amount acts on the transmit power of the uplink data corresponding to the SRS resource). The second SRS resource is at least one resource in the first SRS resource. This can reduce signaling overheads of the TPC indication information. It should be understood that the terminal device sends first data on the first SRS resource means that in a codebook-based uplink transmission mode, the terminal device determines a corresponding SRS resource based on an index of the SRI information, the terminal device uses a transmit antenna corresponding to the SRS resource on the SRS resource, and the terminal device sends the PUSCH data by using the transmit antenna. In a non-codebook-based uplink transmission mode, the terminal device determines the number of PUSCH transmission layers based on a number of SRS resources indicated by the SRI information, and determines a corresponding SRS resource based on an index of the SRI information. One SRS resource corresponds to one precoding matrix. The precoding matrix represents amplitude and phase information between transmit antennas. The terminal device performs PUSCH transmission based on the precoding matrix. It should be understood that the power corresponding to the second SRS resource is transmit power of second data corresponding to the second SRS resource, and the second data is a part of the first data.

With reference to the twenty-first aspect, in some implementations of the twenty-first aspect, the method further includes: The terminal device determines the first SRS resource and the second SRS resource based on an SRS resource in a first parameter group that corresponds to a first identifier in a first mapping relationship. The first mapping relationship indicates a correspondence between a plurality of identifiers and a plurality of parameter groups. Each parameter group includes at least one SRS resource for data transmission, and an SRS resource on which a TPC adjustment amount of the at least one SRS resource for data transmission acts. The second indication information includes the first identifier.

With reference to the twenty-first aspect, in some implementations of the twenty-first aspect, an SRS resource on which a TPC adjustment amount acts in each parameter group belongs to one resource set in at least one SRS resource set. The at least one SRS resource set is in a one-to-one correspondence with at least one communication device.

With reference to the twenty-first aspect, in some implementations of the twenty-first aspect, the terminal device determines a third SRS resource based on a first index that corresponds to a second identifier in a second mapping relationship. The third SRS resource is an SRS resource on which the first TPC adjustment amount is accumulated. The second mapping relationship indicates a mapping relationship between a plurality of identifiers and a plurality of indices. The first index is an index of the third SRS resource. The second indication information includes the second identifier.

In this embodiment of this application, the second identifier may be the same as the first identifier. The third SRS resource is associated with the first TPC adjustment amount by using the first index, so that TPC values of third SRS resources whose first indices are the same can be accumulated.

With reference to the twenty-first aspect, in some implementations of the twenty-first aspect, there is a second index and a third index in the second mapping relationship. The terminal device determines group information corresponding to the second index. A number of SRS resource sets corresponding to the second index is 1. The terminal device determines group information corresponding to the third index. A number of SRS resource sets corresponding to the third index is greater than 1. The terminal device determines the transmit power of the PUSCH based on the group information.

With reference to the twenty-first aspect, in some implementations of the twenty-first aspect, SRS resources corresponding to the third index include SRS resources that belong to a first SRS resource set and a second SRS resource set. The terminal device separately determines group information corresponding to an SRS resource belonging to the first SRS resource set and group information corresponding to an SRS resource belonging to the second SRS resource set.

With reference to the twenty-first aspect, in some implementations of the twenty-first aspect, SRS resource corresponding to the third index includes a first SRS resource. The first SRS resource and a second SRS resource corresponding to the third index value belong to a same SRS resource set. Group information corresponding to the first SRS resource is the same as the group information corresponding to the second index value.

In this embodiment of this application, the first SRS resource corresponding to the third index value and the second SRS resource corresponding to the second index value belong to the same SRS resource set, so that the group information corresponding to the first SRS resource is the same as the group information corresponding to the second index value. This can simplify configuration signaling of the group information of the terminal device.

According to a twenty-second aspect, an indication method is provided. The method includes: A radio access network device determines first indication information, where the first indication information indicates a first transmit power control TPC adjustment amount. The radio access network device determines second indication information, where the second indication information indicates at least one first sounding reference signal SRS resource and indicates a second SRS resource on which the first TPC adjustment amount acts. The second SRS resource is at least one resource in the first SRS resource. The radio access network device sends the first indication information and the second indication information.

Currently, when a terminal device sends uplink data to a plurality of TRPs, the radio access network device needs to multiply, based on a number of TRPs, signaling overheads of transmit power control indication information. In this embodiment of this application, a remaining bit in an SRI field are used, so that the second indication information may indicate the first SRS resource for sending uplink data, and indicate the second SRS resource on which the TPC adjustment amount acts (which means that the TPC adjustment amount acts on transmit power of the uplink data corresponding to the SRS resource). The second SRS resource is at least one resource in the first SRS resource. This can reduce signaling overheads of the TPC indication information.

With reference to the twenty-second aspect, in some implementations of the twenty-second aspect, the method further includes: The radio access network device determines a first identifier in a first mapping relationship based on the first SRS resource and the second SRS resource. The first SRS resource and the second SRS resource belong to SRS resources in a first parameter group that corresponds to the first identifier in the first mapping relationship. The first mapping relationship indicates a correspondence between a plurality of identifiers and a plurality of parameter groups. Each parameter group includes at least one SRS resource for data transmission, and an SRS resource on which a TPC adjustment amount of the at least one SRS resource for data transmission acts. The second indication information includes the first identifier.

With reference to the twenty-second aspect, in some implementations of the twenty-second aspect, an SRS resource on which a TPC adjustment amount acts in each parameter group belongs to one SRS resource set in at least one SRS resource set. The at least one SRS resource set is in a one-to-one correspondence with at least one communication device.

With reference to the twenty-second aspect, in some implementations of the twenty-second aspect, the radio access network device determines a third SRS resource, and determines, based on the third SRS resource, a first index that corresponds to a second identifier in a second mapping relationship. The third SRS resource is an SRS resource on which the first TPC adjustment amount is accumulated. The second mapping relationship indicates a mapping relationship between a plurality of identifiers and a plurality of indices. The first index is an index of the third SRS resource. The second indication information includes the second identifier.

In this embodiment of this application, the second identifier may be the same as the first identifier. The third SRS resource is associated with the first TPC adjustment amount by using the first index, so that TPC values of third SRS resources whose first indices are the same can be accumulated.

With reference to the twenty-second aspect, in some implementations of the twenty-second aspect, there is a second index and a third index in the second mapping relationship. The radio access network device determines group information corresponding to the second index. A number of SRS resource sets corresponding to the second index is 1. The radio access network device determines group information corresponding to the third index. A number of SRS resource sets corresponding to the third index is greater than 1. The radio access network device determines the transmit power of the PUSCH based on the group information.

With reference to the twenty-second aspect, in some implementations of the twenty-second aspect, SRS resources corresponding to the third index include SRS resources that belong to a first SRS resource set and a second SRS resource set. The radio access network device separately determines group information corresponding to an SRS resource belonging to the first SRS resource set and group information corresponding to an SRS resource belonging to the second SRS resource set.

With reference to the twenty-second aspect, in some implementations of the twenty-second aspect, SRS resource corresponding to the third index includes a first SRS resource. The first SRS resource and a second SRS resource corresponding to the third index value belong to a same SRS resource set. Group information corresponding to the first SRS resource is the same as the group information corresponding to the second index value.

In this embodiment of this application, the first SRS resource corresponding to the third index value and the second SRS resource corresponding to the second index value belong to the same SRS resource set, so that the group information corresponding to the first SRS resource is the same as the group information corresponding to the second index value. This can simplify configuration signaling of the group information of the radio access network device.

According to a twenty-third aspect, a terminal device is provided. The terminal device includes: a receiving unit, configured to receive first indication information, where the first indication information indicates a first transmit power control TPC adjustment amount, where the receiving unit receives second indication information, where the second indication information indicates at least one first sounding reference signal SRS resource and indicates a second SRS resource on which the first TPC adjustment amount acts, and the second SRS resource is at least one resource in the first SRS resource; and a sending unit, configured to: send first data on the first SRS resource, and adjust, based on the first TPC adjustment amount, power corresponding to the second SRS resource.

Currently, when the terminal device determines to send uplink data to a plurality of TRPs, the terminal device needs to multiply, based on a number of TRPs, signaling overheads of TPC indication information. In this embodiment of this application, a remaining bit in an SRI field are used, so that the second indication information may indicate the first SRS resource for sending uplink data, and indicate the second SRS resource on which the TPC adjustment amount acts (which means that the TPC adjustment amount acts on transmit power of the uplink data corresponding to the SRS resource). The second SRS resource is at least one resource in the first SRS resource. This can reduce signaling overheads of the TPC indication information. It should be understood that the terminal device sends first data on the first SRS resource means that in a codebook-based uplink transmission mode, the terminal device determines a corresponding SRS resource based on an index of the SRI information, the terminal device uses a transmit antenna corresponding to the SRS resource on the SRS resource, and the terminal device sends the PUSCH data by using the transmit antenna. In a non-codebook-based uplink transmission mode, the terminal device determines the number of PUSCH transmission layers based on a number of SRS resources indicated by the SRI information, and determines a corresponding SRS resource based on an index of the SRI information. One SRS resource corresponds to one precoding matrix. The precoding matrix represents amplitude and phase information between transmit antennas. The terminal device performs PUSCH transmission based on the precoding matrix. It should be understood that the power corresponding to the second SRS resource is transmit power of second data corresponding to the second SRS resource, and the second data is a part of the first data.

With reference to the twenty-third aspect, in some implementations of the twenty-third aspect, the terminal device further includes a processing unit. The processing unit determines the first SRS resource and the second SRS resource based on an SRS resource in a first parameter group that corresponds to a first identifier in a first mapping relationship. The first mapping relationship indicates a correspondence between a plurality of identifiers and a plurality of parameter groups. Each parameter group includes at least one SRS resource for data transmission, and an SRS resource on which a TPC adjustment amount of the at least one SRS resource for data transmission acts. The second indication information includes the first identifier.

With reference to the twenty-third aspect, in some implementations of the twenty-third aspect, an SRS resource on which a TPC adjustment amount acts in each parameter group belongs to one resource set in at least one SRS resource set. The at least one SRS resource set is in a one-to-one correspondence with at least one communication device.

With reference to the twenty-third aspect, in some implementations of the twenty-third aspect, the processing unit determines a third SRS resource based on a first index that corresponds to a second identifier in a second mapping relationship. The third SRS resource is an SRS resource on which the first TPC adjustment amount is accumulated. The second mapping relationship indicates a mapping relationship between a plurality of identifiers and a plurality of indices. The first index is an index of the third SRS resource. The second indication information includes the second identifier.

In this embodiment of this application, the second identifier may be the same as the first identifier. The third SRS resource is associated with the first TPC adjustment amount by using the first index, so that TPC values of third SRS resources whose first indices are the same can be accumulated.

With reference to the twenty-third aspect, in some implementations of the twenty-third aspect, there is a second index and a third index in the second mapping relationship. The terminal device determines group information corresponding to the second index. A number of SRS resource sets corresponding to the second index is 1. The terminal device determines group information corresponding to the third index. A number of SRS resource sets corresponding to the third index is greater than 1. The terminal device determines the transmit power of the PUSCH based on the group information.

With reference to the twenty-third aspect, in some implementations of the twenty-third aspect, SRS resources corresponding to the third index include SRS resources that belong to a first SRS resource set and a second SRS resource set. The terminal device separately determines group information corresponding to an SRS resource belonging to the first SRS resource set and group information corresponding to an SRS resource belonging to the second SRS resource set.

With reference to the twenty-third aspect, in some implementations of the twenty-third aspect, SRS resource corresponding to the third index includes a first SRS resource. The first SRS resource and a second SRS resource corresponding to the third index value belong to a same SRS resource set. Group information corresponding to the first SRS resource is the same as the group information corresponding to the second index value.

In this embodiment of this application, the first SRS resource corresponding to the third index value and the second SRS resource corresponding to the second index value belong to the same SRS resource set, so that the group information corresponding to the first SRS resource is the same as the group information corresponding to the second index value. This can simplify configuration signaling of the group information of the terminal device.

According to a twenty-fourth aspect, a radio access network device is provided. The radio access network device includes: a processing unit, configured to determine first indication information, where the first indication information indicates a first transmit power control TPC adjustment amount, where the processing unit determines second indication information, where the second indication information indicates at least one first sounding reference signal SRS resource and indicates a second SRS resource on which the first TPC adjustment amount acts, and the second SRS resource is at least one resource in the first SRS resource; and a sending unit, configured to send the first indication information and the second indication information.

Currently, when a terminal device sends uplink data to a plurality of TRPs, the radio access network device needs to multiply, based on a number of TRPs, signaling overheads of transmit power control indication information. In this embodiment of this application, a remaining bit in an SRI field are used, so that the second indication information may indicate the first SRS resource for sending uplink data, and indicate the second SRS resource on which the TPC adjustment amount acts (which means that the TPC adjustment amount acts on transmit power of the uplink data corresponding to the SRS resource). The second SRS resource is at least one resource in the first SRS resource. This can reduce signaling overheads of the TPC indication information.

With reference to the twenty-fourth aspect, in some implementations of the twenty-fourth aspect, the method further includes: The processing unit determines a first identifier in a first mapping relationship based on the first SRS resource and the second SRS resource. The first SRS resource and the second SRS resource belong to SRS resources in a first parameter group that corresponds to the first identifier in the first mapping relationship. The first mapping relationship indicates a correspondence between a plurality of identifiers and a plurality of parameter groups. Each parameter group includes at least one SRS resource for data transmission, and an SRS resource on which a TPC adjustment amount of the at least one SRS resource for data transmission acts. The second indication information includes the first identifier.

With reference to the twenty-fourth aspect, in some implementations of the twenty-fourth aspect, an SRS resource on which a TPC adjustment amount acts in each parameter group belongs to one resource set in at least one SRS resource set. The at least one SRS resource set is in a one-to-one correspondence with at least one communication device.

With reference to the twenty-fourth aspect, in some implementations of the twenty-fourth aspect, the processing unit determines a third SRS resource, and determines, based on the third SRS resource, a first index that corresponds to a second identifier in a second mapping relationship. The third SRS resource is an SRS resource on which the first TPC adjustment amount is accumulated. The second mapping relationship indicates a mapping relationship between a plurality of identifiers and a plurality of indices. The first index is an index of the third SRS resource. The second indication information includes the second identifier.

In this embodiment of this application, the second identifier may be the same as the first identifier. The third SRS resource is associated with the first TPC adjustment amount by using the first index, so that TPC values of third SRS resources whose first indices are the same can be accumulated.

With reference to the twenty-fourth aspect, in some implementations of the twenty-fourth aspect, there is a second index and a third index in the second mapping relationship. The radio access network device determines group information corresponding to the second index. A number of SRS resource sets corresponding to the second index is 1. The radio access network device determines group information corresponding to the third index. A number of SRS resource sets corresponding to the third index is greater than 1. The radio access network device determines the transmit power of the PUSCH based on the group information.

With reference to the twenty-fourth aspect, in some implementations of the twenty-fourth aspect, SRS resources corresponding to the third index include SRS resources that belong to a first SRS resource set and a second SRS resource set. The radio access network device separately determines group information corresponding to an SRS resource belonging to the first SRS resource set and group information corresponding to an SRS resource belonging to the second SRS resource set.

With reference to the twenty-fourth aspect, in some implementations of the twenty-fourth aspect, SRS resource corresponding to the third index includes a first SRS resource. The first SRS resource and a second SRS resource corresponding to the third index value belong to a same SRS resource set. Group information corresponding to the first SRS resource is the same as the group information corresponding to the second index value.

In this embodiment of this application, the first SRS resource corresponding to the third index value and the second SRS resource corresponding to the second index value belong to the same SRS resource set, so that the group information corresponding to the first SRS resource is the same as the group information corresponding to the second index value. This can simplify configuration signaling of the group information of the radio access network device.

According to the solutions in embodiments of this application, a reserved bit in the SRI field is used, and the SRS resources are divided into different SRS resource sets to correspond to different TRPs. In this way, two different indices indicate a same SRS resource, but indicate different SRS resources on which power adjustment is performed. In other words, correspondingly, power adjustment is performed on data transmit power of different TRPs.

DESCRIPTION OF EMBODIMENTS

The following describes technical solutions of this application with reference to accompanying drawings. Clearly, the described embodiments are some but not all of embodiments of this application. All other embodiments obtained by a person of ordinary skill in the art based on embodiments of this application without creative efforts shall fall within the protection scope of this application.

Methods in embodiments of this application may be applied to a long term evolution (LTE) system, a long term evolution advanced (LTE-A) system, an enhanced long term evolution (eLTE) system, and a 5th generation (5G) mobile communication system, a new radio (NR) system, or may be extended to a similar wireless communication system, such as a wireless fidelity (Wi-Fi) system, a worldwide interoperability for microwave access (WIMAX) system, and a future 6th generation (6G) system, and a 3rd generation partnership project (3GPP) related cellular system.

Figure 1:
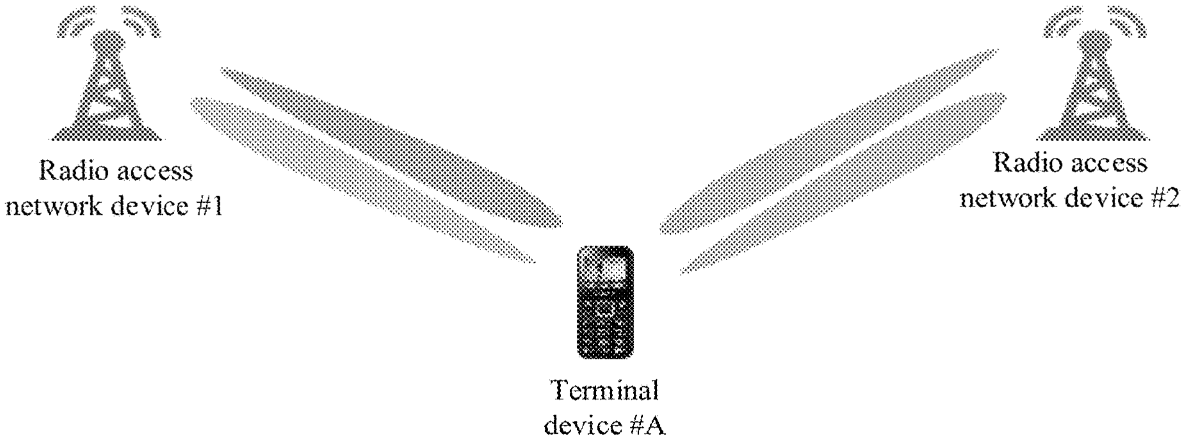
FIG. 1 is a schematic diagram of an example of an application scenario according to an embodiment of this application.

Application scenarios of the technical solutions provided in embodiments of this application may include a plurality of scenarios, for example, a homogeneous network scenario, a heterogeneous network scenario, a single-TRP scenario, a multi-TRP scenario (as shown in FIG. 1), a frequency division duplex (FDD) scenario, and a time division duplex (TDD) scenario. The TRP is a radio access network device.

In embodiments of this application, the radio access network device is an apparatus that is deployed in a radio access network and that is configured to provide a wireless communication function for a terminal device. A function of the radio access network device may be configuring uplink and downlink resources, and/or sending control information such as DCI, and/or sending a downlink signal and receiving an uplink signal. The radio access network device may include various forms of base stations, macro base stations, micro base stations (also referred to as small cells), relay stations, access points, or the like, or various network element devices in a core network (CN). In systems that use different radio access technologies, names of devices having functions of the base station may vary. For example, the radio access network device may be an access point (AP) in a wireless local area network (WLAN), or may be a base station (BS) in a global system for mobile communication (GSM) or code division multiple access (CDMA). Alternatively, the radio access network device may be a 5GNodeB (gNB) or an evolved NodeB (eNB or eNodeB) in an LTE system. Alternatively, the radio access network device may be a NodeB in a 3rd generation (3G) system. In addition, the radio access network device may be a relay station, an access point, a vehicle-mounted device, a wearable device, a radio access network device in a 5th generation (5G) communication network, a radio access network device in a future evolved public land mobile network (PLMN), or the like.

The terminal device in embodiments of this application may also be referred to as user equipment (UE), an access terminal, a terminal device unit (subscriber unit), a terminal device station, a mobile station (MS), a remote station, a remote terminal, a mobile device, a user terminal, a terminal, a wireless communication device, a terminal device agent, or a terminal device apparatus. A function of the terminal device may be receiving a downlink/sidelink signal and/or sending an uplink/sidelink signal. The terminal device may include various handheld devices, vehicle-mounted devices, wearable devices, or computing devices that have a wireless communication function, or other processing devices connected to a wireless modem. The terminal device may further include a user unit, a cellular phone, a smartphone, a wireless data card, a personal digital assistant (PDA) computer, a tablet computer, a wireless modem, a handheld device (handset), a laptop computer, a machine type communication (MTC) terminal, or a station (ST) in a wireless local area network (WLAN). The terminal device may be a cellular phone, a cordless telephone, a session initiation protocol (SIP) telephone, a wireless local loop (WLL) station and a next-generation communication system, for example, a terminal device in a 5G network, or a terminal device in a future evolved PLMN network.

The following explains and describes related terms and technologies in this application:

(1) Non-Codebook-Based Uplink Transmission Mode

For example, when a terminal device is configured as a non-codebook-based uplink transmission mode, a radio access network device sends a channel state information reference signal (CSI-RS) to the terminal device. After receiving the CSI-RS, the terminal device obtains downlink channel quality information through measurement, calculates uplink channel quality information based on channel reciprocity, designs a plurality of precoding matrices based on the uplink channel quality information, precodes a plurality of sounding reference signals (SRS) based on the plurality of precoding matrices, and then sends a plurality of precoded SRSs. Optionally, one precoding matrix corresponds to one SRS, and the precoding matrix indicates amplitude and phase information between transmit antennas. Alternatively, one transmit antenna corresponds to one SRS, or one transmit beam corresponds to one SRS, and a transmit beam is directional. Alternatively, energy distribution of the sent SRSs in space is directional. Optionally, the plurality of SRSs are separately carried on a plurality of SRS resources or SRS ports. After the radio access network device receives the plurality of precoded SRSs, which means that the radio access network device may separately obtain different equivalent channels on the plurality of SRS resources or SRS ports and perform measurement, and indicate, by using DCI, for example, by using SRI, to send, to the terminal device, one or more SRS resources or SRS ports recommended by the radio access network device. The terminal device determines a number of transmission layers of a PUSCH based on a number of SRS resources indicated by the SRI information, and performs PUSCH transmission based on a precoding matrix for sending an SRS on an SRS resource indicated by each SRI. Optionally, the SRS resource indicated by the SRI is in a one-to-one correspondence with a DMRS port of the PUSCH. In this application, this may be referred to as PUSCH transmission corresponding to the SRS resource indicated by the SRI.

Figure 2:
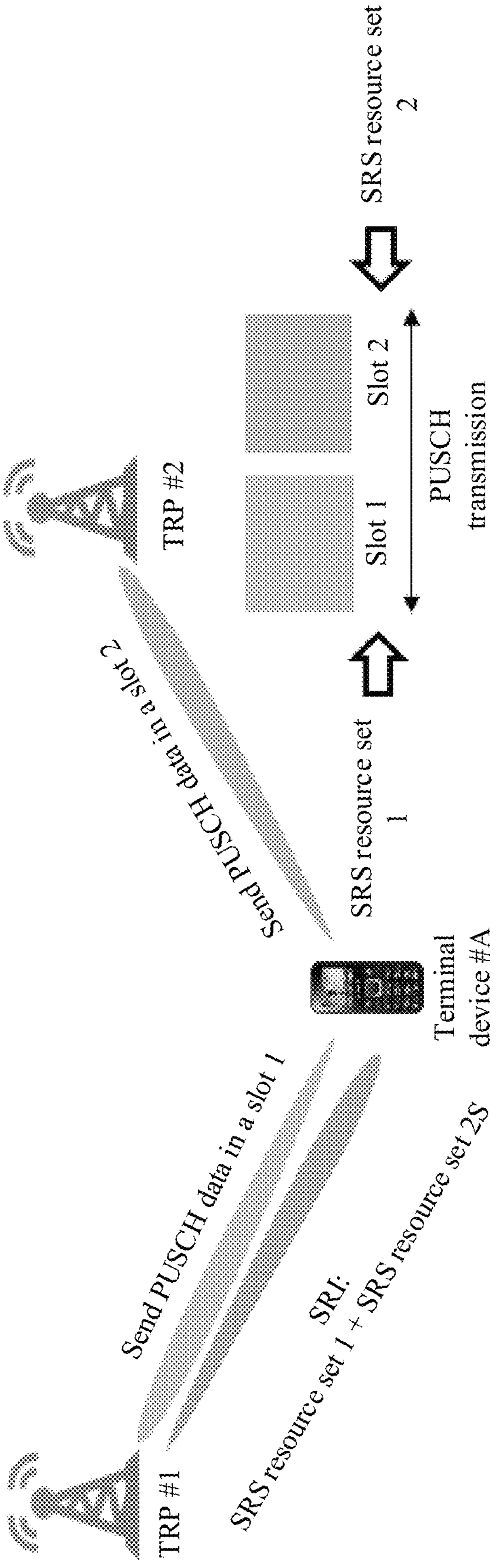
FIG. 2 is a schematic diagram of a scenario of a non-codebook-based uplink transmission mode that is applicable to an embodiment of this application.

FIG. 2 is a schematic diagram of a scenario of the non-codebook-based uplink transmission mode that is applicable to an embodiment of this application. SRI shown in FIG. 2 may be included in DCI. An SRI field indicates indices of some or all of a plurality of configured SRS resources. A number of SRS resources configured for a terminal device may be configured through radio resource control (RRC) signaling.

For example, after receiving the DCI, the terminal device first determines a table based on a maximum number of uplink transmission layers (that is, a maximum number of supported layers for PUSCH (Maximum number of supported layers for PUSCH), which may be marked as L_max). For example, in a 5G standard, if L_max=3, the determined table may be "Table 7.3.1.1.2-30: SRI indication for non-codebook based PUSCH transmission (SRI indication for non-codebook based PUSCH transmission, L_max=3)", as shown in Table 1. The maximum number of uplink transmission layers L_max may be configured through the radio resource control RRC signaling. Then, the terminal device determines, based on the number of configured SRS resources (N_SRS) and the index carried in the SRI field, a table cell in the table. A number in the table cell represents an index of an SRS resource recommended by the radio access network device, and a number of indices of SRS resources included in the table cell represents a number of PUSCH transmission layers. For example, refer to Table 1. When four SRS resources are configured for the terminal device, in other words, N_SRS=4, and the index carried in the SRI field is 8, the determined cell includes 1 and 3. It can be learned that SRS resources numbered 1 and 3 are recommended by the radio access network device, the SRS resource 1 and the SRS resource 3 correspond to PUSCH transmission, and the number of PUSCH transmission layers is 2.

TABLE 1

| Index | SRI(s), N_SRS = 2 | Index | SRI(s), N_SRS = 3 | Index | SRI(s), N_SRS = 4 |
|---|---|---|---|---|---|
| 0 | 0 | 0 | 0 | 0 | 0 |
| 1 | 1 | 1 | 1 | 1 | 1 |

TABLE 1-continued

| Index | SRI(s), N_SRS = 2 | Index | SRI(s), N_SRS = 3 | Index | SRI(s), N_SRS = 4 |
|---|---|---|---|---|---|
| 2 | 0, 1 | 2 | 2 | 2 | 2 |
| 3 | Reserved | 3 | 0, 1 | 3 | 3 |
| | | 4 | 0, 2 | 4 | 0, 1 |
| | | 5 | 1, 2 | 5 | 0, 2 |
| | | 6 | 0, 1, 2 | 6 | 0, 3 |
| | | 7 | Reserved | 7 | 1, 2 |
| | | | | 8 | 1, 3 |
| | | | | 9 | 2, 3 |
| | | | | 10 | 0, 1, 2 |
| | | | | 11 | 0, 1, 3 |
| | | | | 12 | 0, 2, 3 |
| | | | | 13 | 1, 2, 3 |
| | | | | 14-15 | Reserved |

The index in Table 1 is an index to which a bit field is mapped (Bit field mapped to index), and the bit field is specifically the SRI field.

It should be noted that the foregoing related descriptions of the non-codebook-based uplink transmission mode are all examples, and do not constitute a limitation on the non-codebook-based uplink transmission mode described in this application.

(2) Codebook-Based Uplink Transmission Mode

For example, when a terminal device is configured as a codebook-based uplink transmission mode, the terminal device sends an SRS to a radio access network device on an SRS resource. The radio access network device selects an appropriate PUSCH precoding matrix and an appropriate number of PUSCH transmission layers based on a received SRS channel measurement condition, and then sends the selected PUSCH precoding matrix and number of PUSCH transmission layers to the terminal device by using DCI. The PUSCH precoding matrix is specifically a precoding matrix used for sending data on a PUSCH, and the precoding matrix indicates amplitude and phase information of a transmit antenna. The transmit antenna is in a one-to-one correspondence with each port of an SRS resource. A row of the precoding matrix corresponds to an SRS port in the transmit antenna or the SRS resource. A column of the precoding matrix corresponds to the PUSCH transmission layer. Subsequently, the terminal may perform PUSCH transmission by using the PUSCH precoding matrix and the number of PUSCH transmission layers that are recommended by the radio access network device.

Figure 3:
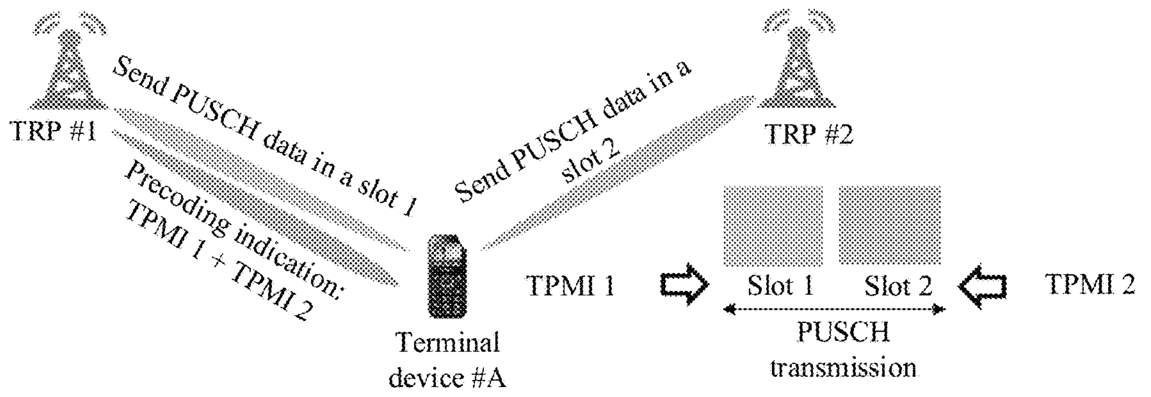
FIG. 3 is a schematic diagram of a scenario of a codebook-based uplink transmission mode that is applicable to an embodiment of this application.

FIG. 3 is a schematic diagram of a scenario of the codebook-based uplink transmission mode that is applicable to an embodiment of this application. As shown in FIG. 3, a precoding information and number of layers field (a precoding indication) may be included in the DCI. Optionally, the DCI may further include an SRI field.

The SRI field indicates an index of the SRS resource, and the index indicates one SRS resource selected from a plurality of configured SRS resources. In an example, in the codebook-based uplink transmission mode, two SRS resources may be configured for the terminal device. If one SRS resource is configured for the terminal device, the DCI may not include the SRI field. If two SRS resources are configured for the terminal device, the terminal device may send SRSs on different SRS resources through different transmit antennas or different directional transmit beams. The radio access network device notifies, by using the SRI indication, the terminal device of information such as a transmit antenna or a transmit beam used for the PUSCH transmission. It may be understood that each row in the precoding matrix corresponds to each SRS port of an SRS resource indicated by the radio access network device. A number of SRS resources configured for the terminal device may be configured through RRC signaling. For example, a maximum of four SRS ports may be configured for each SRS resource, and a number of SRS ports configured for each SRS resource may be configured through RRC signaling.

The precoding information and number of layers indication field is used to carry an index, and the index indicates a transmission rank indicator (TRI) and a TPMI. The TRI is used to configure a number of PUSCH transmission layers. The TPMI is used to configure a PUSCH precoding matrix.

For related descriptions of an antenna port field, refer to the following descriptions:

For example, after receiving the DCI, the terminal device first determines a table based on a maximum number of uplink transmission layers (for example, marked as maxRank, maxRank=L_max) and a number of SRS ports configured for an SRS resource indicated by the SRI field. For example, in a 5G standard, it is assumed that maxRank=2, and the number of SRS ports configured for the SRS resource indicated by the SRI field is 2. In this case, the determined table may be "Table 7.3.1.1.2-4: Precoding information and number of layers, for 2 antenna ports, if transform precoder=disabled, maxRank=2 (Precoding information and number of layers, for 2 antenna ports, if transform Precoder=disabled and maxRank=2)". A part of the Table 7.3.1.1.2-4 is shown in Table 2. Then, the terminal device may determine a table cell in the table based on the index carried in the precoding information and number of layers field. A number of layers included in the table cell indicates a value of the TRI, namely, a value of the number of PUSCH transmission layers. For example, if the index carried in the precoding information and number of layers field is 4, the table cell determined by the terminal includes "1 layer: TPMI=3". In other words, a TRI recommended by the radio access network device is 1, that is, the number of PUSCH transmission layers is 1, and an index value of the TPMI is 3. For another example, if the index carried in the precoding information and number of layers field is 2, the table cell determined by the terminal includes "2 layers: TPMI=0". In other words, a TRI recommended by the radio access network device is 1, that is, the number of PUSCH transmission layers is 2, and an index value of the TPMI is 0.

TABLE 2

| Index | Codebook subset = fully-coherent, partially-coherent, and noncoherent |
|---|---|
| 0 | 1 layer: TPMI = 0 |
| 1 | 1 layer: TPMI = 1 |
| 2 | 2 layers: TPMI = 0 |
| 3 | 1 layer: TPMI = 2 |
| 4 | 1 layer: TPMI = 3 |
| 5 | 1 layer: TPMI = 4 |
| 6 | 1 layer: TPMI = 5 |
| 7 | 2 layers: TPMI = 1 |
| 8 | 2 layers: TPMI = 2 |
| 9-15 | Reserved |

The index in Table 2 is an index to which a bit field is mapped, and the bit field is specifically the precoding information and number of layers indication field.

Then, the terminal device may determine one codebook based on the TRI and the number of SRS ports configured for the SRS resource indicated by the SRI field. The TPMI indicates one precoding matrix in the codebook. The codebook is pre-stored in the radio access network device and the terminal device. A number of rows of each precoding matrix in the codebook is the number of SRS ports configured for the SRS resource indicated by the SRI field, and a number of columns is the number of transmission layers indicated by the TRI. For example, in the 5G standard, based on the foregoing example, a number of SRS ports is 2, and a TRI is "1 layer". In this case, the determined codebook is "Table 6.3.1.5-1: Precoding matrix W for single-layer transmission using two antenna ports", as shown in Table 3.

TABLE 3

| TPMI index | Ordered from left to right in increasing order of TPMI index. | | | | | | | |
|---|---|---|---|---|---|---|---|---|
| 0-5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | — | — |

For example, it is assumed that information that is indicated by the precoding information and number of layers field and that is determined by the terminal device is "1 layer: TPMI=3". Refer to Table 3. It can be learned that a precoding matrix recommended by the radio access network device is $$\frac{1}{\sqrt{2}}\begin{bmatrix}1\\-1\end{bmatrix}.$$

It should be noted that the foregoing related descriptions of the codebook-based uplink transmission mode are all examples, and do not constitute a limitation on the codebook-based uplink transmission mode described in this application.

(3) A radio access network device adjusts transmit power of a terminal device by using a transmit power control command (TPC Command).

When the radio access network device schedules a resource for the terminal device, to prolong battery use duration of the terminal device and reduce intra- and inter-cell interference, transmit power of the terminal device cannot be excessively used. The radio access network device adjusts the transmit power of the terminal device by sending the TPC command. The terminal device may adjust the uplink transmit power based on the TPC command in two manners: an accumulation manner and an absolute manner. In the accumulation manner, the terminal device accumulates a value corresponding to TPC received from the radio access network device each time, and uses an accumulation result to adjust the uplink transmit power. It should be understood that the accumulation manner is used for TPC to enable an uplink transmit power value to dynamically adapt to a current channel status. When determining transmit power of current uplink transmission, the terminal device needs to accumulate a TPC value indicated when scheduling the current uplink transmission and another TPC value received in a previous period of time. In the absolute manner, the terminal device directly uses a value corresponding to TPC received from the radio access network device each time, to adjust the uplink transmit power, and does not accumulate a TPC value indicated in previous scheduling. The foregoing power control mechanism in which a current transmit power value is dynamically adjusted by using the TPC may be referred to as a closed-loop power control mechanism. The terminal device needs to determine transmit power of current uplink transmission based on the transmit power value determined by using the open-loop power control mechanism and the transmit power value determined by using the closed-loop power control mechanism. The radio access network device sends a TPC index to the terminal device. Based on the index and a manner of adjusting the uplink transmit power configured for the terminal device, the terminal device obtains, by searching a table, a corresponding power adjustment value, and adjusts the transmit power of corresponding uplink data based on the power adjustment value.

For example, the terminal device adjusting the transmit power in the accumulation manner. The transmit power value determined by the terminal device based on the open-loop power control mechanism is 5 dBm. The radio access network device adjusts the power of the terminal device based on Table 4 in a 5G standard. An index value of the TPC field sent by the radio access network device to the terminal device for the first time is 0. After receiving the index value, the terminal device obtains, by searching Table 4, a corresponding accumulated adjustment value −1 dB. Then, (−1 dB) is added to 5 dBm. In this case, transmit power of PUSCH from the terminal device to the radio access network device is 4 dBm. An index value of the TPC field sent by the radio access network device to the terminal device for the second time is 2. After receiving the index value, the terminal device obtains, by searching Table 4, a corresponding accumulated adjustment value 1 dB. Then, (1 dB) is added to 4 dBm. In this case, transmit power of PUSCH from the terminal device to the radio access network device is 5 dBm. By analogy, the transmit power may be obtained.

TABLE 4

| Index | Accumulated adjustment value (dB) | Absolute adjustment value (dB) |
|---|---|---|
| 0 | −1 | −4 |
| 1 | 0 | −1 |
| 2 | 1 | 1 |
| 3 | 3 | 4 |

It should be noted that the foregoing descriptions in which the radio access network device adjusts the uplink transmit power of the terminal device by using the TPC is an example, and do not constitute a limitation on the power adjustment manner in this application.

With reference to the accompanying drawings, the following describes the technical solutions provided in embodiments of this application.

Figure 4:
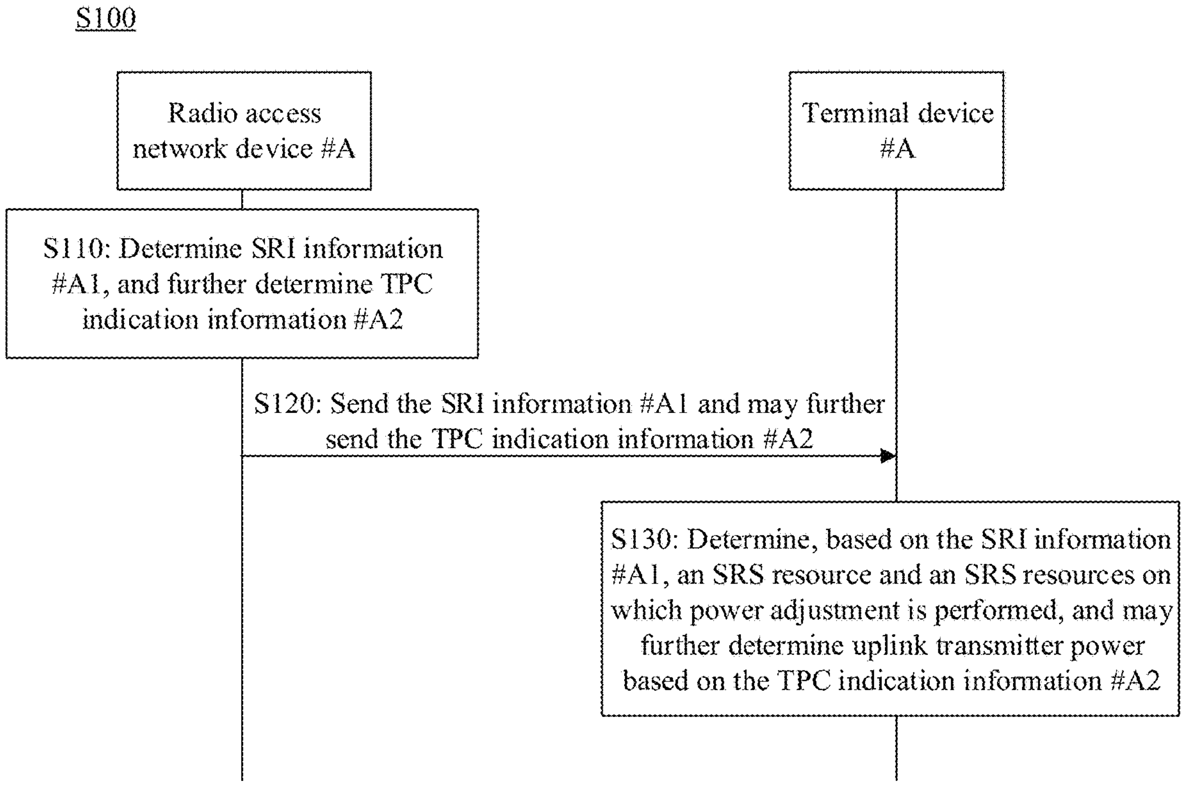
FIG. 4 is a schematic interaction diagram of an example of an indication method according to this application.

FIG. 4 is a schematic flowchart of an indication method 100 according to this application.

The following uses an example in which a maximum number of configured SRS resource sets is 2. In this application, a number of configured SRS resource sets may be greater than 2.

In S110, a radio access network device #A determines SRI information #A1. The SRI information #A1 indicates to select, from n configured SRS resources, SRS resources that belong to m SRS resource sets, where n>1, m∈{1, 2}, and all SRS resources in the m SRS resource sets are the n SRS resources.

Optionally, one SRS resource set corresponds to one set of SRS open-loop power control parameters, and different SRS resource sets may correspond to different SRS open-loop power control parameters. Therefore, each TRP may obtain an uplink channel based on the different SRS resource sets.

The SRI information #A1 includes an index. The index is from a first index value set. There are a plurality of index values in the first index value set. There are at least two index values in the plurality of index values, which are referred to as a first index value and a second index value. SRS resources corresponding to each of the first index value and the second index value belong to two SRS resource sets: the first SRS resource set and the second SRS resource set. The SRS resources corresponding to the first index value and the SRS resources corresponding to the second index value are the same but in different orders. In the SRS resources corresponding to the first index value, an SRS resource in the first SRS resource set is prior to an SRS resource in the second SRS resource set (in other words, a $1^{st}$ SRS resource belongs to the first SRS resource set). In the SRS resources corresponding to the second index value, an SRS resource in the second SRS resource set is prior to an SRS resource in the first SRS resource set (in other words, a $1^{st}$ SRS resource belongs to the second SRS resource set).

In a possible implementation, the first index value set includes the first index value, the second index value, and a third index value. A number of SRS resources corresponding to the third index value is 1, or an SRS resource corresponding to the third index value belongs to one SRS resource set.

Optionally, the index value of the SRI information may also be referred to as a status value or a bit field value. Each index value corresponds to different indication information. For example, different index values correspond to different SRS resources or SRS resource sets. The correspondence may be pre-stored in the radio access network device and the terminal device.

Specifically, a number of indices in the first index value set corresponding to the SRI information #A1 (the first index value set corresponding to the SRI information #A1 in this application may be understood as index values included in the SRS indication information #A1, and the index value belongs to the first index value set) depends on a number of configured SRS resources and/or SRS resource sets.

For codebook-based PUSCH transmission, when a number of SRS resource sets is 1, a number of index values in the first index value set corresponding to the SRI information #A1 is n. n is the number of configured SRS resources. Each index value in the first index value set corresponds to one configured SRS resource. Different index values correspond to different SRS resources. When a number of SRS resource sets is 2, a number of index values corresponding to one SRS resource in the first index value set corresponding to the SRI information #A1 is n. The first index value set further includes at least two index values, for example, the first index value and the second index value, and optionally, further includes the third index value.

Optionally, when the SRI information #A1 indicates a plurality of SRS resources (or SRS resource sets), different SRS resources (or SRS resource sets) correspond to different time-frequency resources occupied by PUSCH. For example, the PUSCH occupies two orthogonal frequency division multiplexing (OFDM) symbol groups. Each OFDM symbol group corresponds to one SRS resource indicated by the SRI information. In this case, a transmit antenna or a transmit beam of each OFDM symbol group may be determined based on a transmit antenna or a transmit beam used for sending an SRS on a corresponding SRS resource. For example, the PUSCH occupies a slot 0 and a slot 1. When the SRI information indicates two SRS resources (an SRS resource 0 and an SRS resource 1), the slot 0 corresponds to the SRS resource 0, and the slot 1 corresponds to the SRS resource 1. In this case, when performing PUSCH transmission in the slot 0, the terminal device uses a transmit antenna, a transmit beam, and the like for sending an SRS on the SRS resource 0. When performing PUSCH transmission in the slot 1, the terminal device uses a transmit antenna, a transmit beam, and the like for sending an SRS on the SRS resource 1. Refer to FIG. 2.

Optionally, when the first index value indicates a plurality of SRS resources, the plurality of SRS resources belong to different SRS resource sets. Alternatively, it may be understood that the SRS resources indicated by the first index value belong to a plurality of SRS resource sets.

In a possible implementation, the radio access network device #A determines TPC indication information #A2. The TPC indication information is used to adjust transmit power of PUSCH transmission corresponding to the first SRS resource set of the m SRS resource sets, and 1≤m≤n.

Based on this embodiment of this application, the TPC indication information #A2 is used to adjust only PUSCH transmission corresponding to one of the two SRS resources indicated by the index in the SRI information #A1 (it should be understood that an SRS resource indicated by the index in the SRI information #A1 in this application may also be represented as an SRS resource indicated by the SRI information #A1) (in this application, which is briefly referred to as follows: The TPC indication information #A2 acts on one SRS resource). Alternatively, the TPC indication information #A2 is only used to adjust PUSCH transmission corresponding to one of two SRS resource sets indicated by the index in the SRI information #A1, and the two SRS resources may belong to different SRS resource sets.

Optionally, the SRI information #A1 indicates an SRS resource on which the TPC indication information #A2 acts. For example, the first index value set includes two index values (for example, an index value #1 and an index value #2). The two index values correspond to two SRS resources (for example, the SRS resource 1 and an SRS resource 2). The SRS resources corresponding to the index value #1 are the same as the SRS resources corresponding to the index value #2. The index value #1 indicates that the TPC indication information #A2 acts on the SRS resource 1. The index value #2 indicates that the TPC indication information #A2 acts on the SRS resource 2.

Optionally, the TPC indication information #A2 acts on the $1^{st}$ SRS resource or the SRS resource in the first SRS resource set that is indicated by the index of the SRI information #A1. For example, the first index value set includes two index values (for example, an index value #1 and an index value #2). The two index values correspond to two SRS resources (for example, the SRS resource 1 and an SRS resource 2). The SRS resources corresponding to the index value #1 are the same as the SRS resources corresponding to the index value #2. An order of the SRS resources corresponding to the index value #1 is the SRS resource 1 and then the SRS resource 2. An order of the SRS resources corresponding to the index value #2 is the SRS resource 2 and then the SRS resource 1. In this case, for the index value 1 #, the TPC indication information #A2 acts on the SRS resource 1, and for the index value #2, the TPC indication information acts on the SRS resource 2.

For non-codebook-based PUSCH transmission, when a number of configured SRS resource sets is 1, the SRI information #A1 includes an index value. The index value belongs to a first index value set. A number of index values in the first index value set is related to a number n of SRS resources and a currently configured maximum number of PUSCH transmission layers. When the maximum number of transmission layers is greater than 1, the index value of the SRI information #A1 may correspond to a plurality of SRS resources. A number of SRS resources corresponding to the index value in the SRI information #A1 is a number of PUSCH transmission layers. When a number of configured SRS resource sets is 2, index values in the first index value set corresponding to the SRI information #A1 include an index value corresponding to one SRS resource set, and further include at least two index values, for example, the first index value and the second index value, and optionally, further include the third index value.

Optionally, when the SRI information #A1 indicates a plurality of SRS resources (it should be understood that the SRS resources indicated by the SRI information #A1 in this application are SRS resources corresponding to the index in the SRI information #A1). The plurality of SRS resources belong to different SRS resource sets. Different SRS resource sets correspond to different time-frequency resources occupied by PUSCH. For example, the PUSCH occupies two OFDM symbol groups. Each OFDM symbol group corresponds to one SRS resource set indicated by the SRI. In this case, a transmit antenna or a transmit beam of each OFDM symbol group may be determined based on a transmit antenna or a transmit beam used for sending an SRS on an SRS resource in a corresponding SRS resource set. For example, a PUSCH occupies a slot 0 and a slot 1. When the SRI information indicates two SRS resource sets (an SRS resource set 0 and an SRS resource set 1), and indicates an SRS resource 0 and an SRS resource 1 in the SRS resource set 0, and an SRS resource 2 and an SRS resource 3 in the SRS resource set 1, the slot 0 corresponds to the SRS resource 0 and the SRS resource 1 in the SRS resource set 0, and the slot 1 corresponds to the SRS resource 2 and the SRS resource 3 in the SRS resource set 1. In this case, when performing PUSCH transmission in the slot 0, the terminal device uses transmit antennas, transmit beams, and the like for sending SRSs on the SRS resource 0 and the SRS resource 1 in the SRS resource set 0. When performing PUSCH transmission in the slot 1, the terminal device uses transmit antennas, transmit beams, and the like for sending SRSs on the SRS resource 2 and the SRS resource 3 in the SRS resource set 1. In this case, in both the slot 0 and the slot 1, a number of PUSCH transmission layers is 2 (depending on a number of SRS resources in one SRS resource set corresponding to an index in the SRI information).

Based on this embodiment of this application, the TPC indication information #A2 is used to adjust only PUSCH transmission corresponding to all SRS resources in one of the two SRS resource sets indicated by the SRI information #A1 (in this application, which is briefly referred to as follows: The TPC indication information #A2 acts on one SRS resource set).

Further, optionally, the TPC indication information #A2 is used to adjust only PUSCH transmission corresponding to all or some SRS resources in one SRS resource set (for example, a target SRS resource set) of the two SRS resource sets (for example, the first SRS resource set and the second SRS resource set) indicated by the SRI information #A1.

In a possible implementation, the target SRS resource set may be a $1^{st}$ SRS resource set in an order in the first SRS resource set and the second SRS resource set.

Optionally, the SRI information #A1 indicates an SRS resource or an SRS resource set on which the TPC indication information #A1 acts. For example, the first index value set includes two index values (for example, an index value #1 and an index value #2). Each of the two index values corresponds to two SRS resource sets (including the SRS resource set 0 and the SRS resource set 1). The SRS resource set 0 includes SRS resources 0 and 1. The SRS resource set 1 includes SRS resources 2 and 3. An SRS resource corresponding to the index value #0 is the same as an SRS resource corresponding to the index value #1. The index value #1 indicates that the TPC indication information #A2 acts on the SRS resource 0 and/or the SRS resource 1 in the SRS resource set 0. The index value 2 indicates that the TPC indication information #A2 acts on the SRS resource 2 and/or the SRS resource 3 in the SRS resource set 1.

Optionally, the TPC indication information #A acts on some or all of SRS resources in the $1^{st}$ SRS resource set corresponding to the index in the SRI information #A1. For example, the first index value set includes two index values (for example, an index value #1 and an index value #2). Each index value corresponds to two SRS resource sets (including the SRS resource set 0 and the SRS resource set 1). The SRS resources corresponding to the index value #1 are the same as the SRS resources corresponding to the index value #2. SRS resource sets indicated by the index value #1 are the SRS resource set 0 and then the SRS resource set 1 in an order. SRS resource sets indicated by the index value 2 are the SRS resource set 1 and then the SRS resource set 0 in an order. In this case, for the index value 1, the TPC indication information #A2 acts on the SRS resource set 0, and for the index value 2, the TPC indication information #A2 acts on the SRS resource set 1.

The order of the SRS resources or the SRS resource sets in this embodiment of this application may be understood as follows: When a mapping relationship table between the index value of the SRI information of the radio access network device or the terminal device and an SRS resource number is configured, the SRS resources or the SRS resource sets are usually sorted, or the SRS resource number (the order of the SRS resource sets) is arranged according to a specific rule.

Optionally, group information corresponding to a fourth index value in the first index value set is determined. Each fourth index value corresponds to only one SRS resource set. Group information corresponding to a fifth index value in the first index value set is determined based on the group information corresponding to the fourth index value. Each fifth index value corresponds to two SRS resource sets. In the resource sets corresponding to the fifth index value, different SRS resource sets (the SRS resource set 0 and the SRS resource set 1) correspond to different group information. Transmit power adjustment values of PUSCH transmission corresponding to SRS resources that correspond to same group information may be accumulated.

Further, optionally, in the SRS resource sets corresponding to the fifth index value, group information corresponding to the SRS resource set 0 is determined based on group information corresponding to one index value (an index value 0) in the fourth index value, and group information corresponding to the SRS resource set 1 is determined based on group information corresponding to another index value (an index value 1) in the fourth index value. An SRS resource corresponding to the index value 0 is the same as an SRS resource included in the SRS resource set 0 corresponding to the fifth index value. An SRS resource corresponding to the index value 1 is the same as an SRS resource included in the SRS resource set 1 corresponding to the fifth index value.

Optionally, each SRS resource belongs to only one SRS resource set, and power control may be independently performed on an SRS sent on each SRS resource set.

In this application, the index value of the SRI information may also be referred to as a status value of the SRI information, or an indication value of the SRI information.

In this application, a number of configured SRS resource sets may be greater than 2.

A specific manner is as follows:

Manner 1: Codebook-Based PUSCH Transmission

When two SRS resources are configured for the terminal device #A, the two SRS resources may belong to different SRS resource sets. A codebook-based SRI indication comparison table is shown in Table 5 (it is assumed that the two SRS resources are the SRS resource 0 and the SRS resource 1).

TABLE 5

| Number of configured SRS resources = 2 | |
|---|---|
| Index value of the SRI information | SRS resource number |
| 0 | 0 |
| 1 | 1 |
| 2 | 0, 1 |
| 3 | 1, 0 |

Table 5 may be understood with reference to Table 1. The index value of the SRI information in Table 5 may be an index to which a bit field of the indication information #A is mapped. The bit field may be an SRI field. For example, when an index value of the SRI field is 0, a corresponding SRS resource is an SRS #0; or when the index value of the SRI field is 2, a corresponding SRS resource is an SRS #0 and an SRS #1. The radio access network device #A indicates the terminal device #A to select a transmit beam/transmit antenna group based on the SRS resource.

It should be understood that, in this application, SRS resources in different SRS resource sets may be independently numbered. In other words, SRS resource numbers in both SRS resource sets 0 and 1 start from 0. In this case, SRS resources with a same number are distinguished by using the SRS resource sets. Alternatively, SRS resources in different SRS resource sets may be jointly numbered. That is, SRS resource numbers (starting from 0) in the SRS resource set 0 are first numbered, and then SRS resource numbers in the SRS resource set 1 are numbered. In this case, each SRS resource has a different number.

The radio access network device #A may group the SRS resources. For example, when there are two TRPs, the SRS resources are grouped based on a number of TRPs. If the SRS #0 is configured as the first SRS resource set, the SRS #0 corresponds to a channel from the terminal device #A to a TRP #0. If the SRS #1 is configured as the second SRS resource set, the SRS #1 corresponds to a channel from the terminal device #A to a TRP #1. SRS transmit power may be independently determined for different SRS resource sets. When the index value is 0 or 1, it indicates that one TRP receives data sent by the terminal device #A. When the index value is 2 or 3, it indicates that two TRPs receive data sent by the terminal device #A. In addition, based on Table 5, an SRS resource on which a TPC adjustment amount (which may also be referred to as a TPC indication value) corresponding to each index in the table acts (which may be understood as that the TPC adjustment amount acts on transmit power of PUSCH data corresponding to the SRS resource) may be agreed in the following manner.

Manner c

The SRS resource corresponding to the TPC adjustment amount corresponding to the index value of the SRI information is a specified SRS resource, for example, as shown in Table 5.1.

TABLE 5.1

| Number of configured SRS resources = 2 | | |
|---|---|---|
| Index value of the SRI information | SRS resource number | SRS resource number corresponding to the TPC adjustment amount |
| 0 | 0 | 0 |
| 1 | 1 | 1 |
| 2 | 0, 1 | 1 |
| 3 | 1, 0 | 1 |

The index value of the SRI information in Table 5.1 is the index to which the bit field of the indication information #A is mapped. The bit field may be the SRI field. The SRS resource corresponding to the TPC adjustment amount is transmit power of uplink data adjusted by the TPC adjustment amount, and the uplink data is sent based on the SRS resource. The SRS resources corresponding to the TPC adjustment amounts that correspond to the index 2 and the index 3 are both the specified SRS #1, or may be both the SRS #0. Alternatively, the index 2 may correspond to the SRS #0, and the index 3 may correspond to the SRS #1. The SRS resource corresponding to the TPC adjustment amount corresponding to the index is not limited in this application.

Manner d

The SRS resource corresponding to the TPC adjustment amount corresponding to the index value of the SRI information is a $1^{st}$ SRS resource, or a $2^{nd}$ SRS resource in the SRS resource set, or the like. Based on Table 5, it may alternatively be agreed that some or all of SRS resources in the $1^{st}$ SRS resource set or some or all of SRS resources in the $2^{nd}$ SRS resource set, for example, as shown in Table 5.2.

TABLE 5.2

| Number of configured SRS resources = 2 | | |
|---|---|---|
| Index value of the SRI information | SRS resource number | SRS resource number corresponding to a TPC adjustment amount |
| 0 | 0 | 0 |
| 1 | 1 | 1 |
| 2 | 0, 1 | 0 |
| 3 | 1, 0 | 1 |

The manner d is used as an example. After grouping the SRS resources, the radio access network device #A determines an index of the SRI field based on the SRS resource or the SRS resource set corresponding to the TPC adjustment amount, and generates the indication information #A based on the index and/or the TPC adjustment amount. For example, the radio access network device #A determines that the SRS resource is the SRS #0, and the SRS resource corresponding to the TPC adjustment amount is the SRS #0. Because the SRS #0 corresponds to the TRP #0, it may be understood that the TPC adjustment amount acts on the TRP #0. In this case, it may be determined, based on the SRS resource corresponding to the TPC adjustment amount, that the index value of the SRI field is 0. For another example, if the radio access network device #A determines that the SRS resource is the SRS #0 and the SRS #1, and the SRS resource corresponding to the TPC adjustment amount is the SRS #0, it may be determined that a rank of the SRS resource is the SRS #0 and then the SRS #1 (in other words, the 1$^{st}$ SRS resource is the SRS #0, and the 2$^{nd}$ SRS resource is the SRS #1). It may be determined, based on the SRS resource corresponding to the TPC adjustment amount, that the corresponding index value of the SRI field is 2.

Optionally, the radio access network device #A may configure group information associated with the SRS resource, for example, a value t (it should be noted that, in this application, the value t may denote the group information), so that TPC values corresponding to SRS resources associated with a same value t may be accumulated. There is a manner A and a manner B.

Manner A

Each SRS resource is configured to be associated with one value t, as shown in Table 6. Values of the value t and the TPC adjustment amount are only examples, and do not constitute a limitation on this application. In Table 6, an SRS resource corresponding to each index is associated with one value t. In this manner, a value t on which TPC acts and that corresponds to each index may be specified, that is, the value t is associated with the index value of the SRI information.

TABLE 6

| Number of configured SRS resources = 2 | | | |
|---|---|---|---|
| Index value of the SRI information | SRS resource number | Value t | Value t on which TPC acts |
| 0 | 0 | t = 0 | 0 |
| 1 | 1 | t = 1 | 1 |
| 2 | 0, 1 | SRI(s) = 0: t = 0<br>SRI(s) = 1: t = 1 | 0 |
| 3 | 1, 0 | SRI(s) = 1: t = 1<br>SRI(s) = 0: t = 0 | 0 |

Assuming that the TPC adjustment amount acts on the SRS resource in the foregoing manner d, according to Table 6, an accumulated TPC value is calculated as shown in Table 6.1. In Table 6.1, PUSCHs on different PUSCH transmission occasions are scheduled by using different DCI signaling. Each DCI signaling includes one TPC indication. The value t on which TPC acts indicates that TPC corresponding to an SRS resource associated with the value t is accumulated. It is assumed that initial values of the accumulated TPC corresponding to the SRS #0 and the SRS #1 are both 0 dB.

TABLE 6.1

| | Index value of the SRI information | | | |
|---|---|---|---|---|
| | #0 | #1 | #2 | #3 |
| TPC adjustment amount | 1 dB | 3 dB | −1 dB | 3 dB |
| PUSCH transmission occasion | 0 | 1 | 2 | 3 |
| Accumulated TPC corresponding to an SRS#0 | 1 dB | 1 dB | 0 dB | 3 dB |
| Accumulated TPC corresponding to an SRS#1 | 0 dB | 3 dB | 3 dB | 3 dB |

In Table 6.1, each SRS resource is associated with a different value t. During TPC accumulation, accumulation is performed separately based on the value t on which TPC acts. When the PUSCH transmission occasion is 3, the accumulated TPC corresponding to the SRS #0 is 0 dB, and the accumulated TPC corresponding to the SRS #1 is 2 dB.

Manner B

SRS resources in a same resource set are configured to be associated with a same value t, and TPC values corresponding to SRS resources associated with a same value t may be accumulated, as shown in Table 7. Values of the value t and the TPC adjustment amount are only examples, and do not constitute a limitation on this application. In this manner, the value t on which TPC acts and that corresponds to each index may be a value t corresponding to a prior SRS resource set (that is, the 1$^{st}$ SRS resource set) in an order.

It should be understood that, in this embodiment, the index value of the SRI information may be further configured to be associated with the value t. For example, as shown in Table 6 or Table 7, the index values 0 and 1 of the SRI information are respectively associated with different values t: 0 and 1. In this case, the index values 0 and 1 of the SRI information are the first index value, the index values 2 and 3 of the SRI information are the second index value, and group information associated with the index values 2 and 3 is determined based on the index values 0 and 1. Specifically, in the index values 2 and 3, the index value corresponding to the SRS resource 0 is determined based on group information associated with the index value 0, that is, t=0. The index value corresponding to the SRS resource 1 is determined based on group information associated with the index value 1, that is, t=1. In this case, the values t do not need to be explicitly configured for the index values 2 and 3.

Optionally, the second index value may also be explicitly associated with the value t. In this case, the value t is associated with only the first SRS resource set in a plurality of SRS resource sets indicated by the second index value.

TABLE 7

| Index value of the SRI information | SRI(s), N_SRS = 2 | Value t | Value t on which TPC acts |
|---|---|---|---|
| 0 | 0 | t = 0 | 0 |
| 1 | 1 | t = 1 | 1 |
| 2 | 0, 1 | SRI(s) = 0: t = 0<br>SRI(s) = 1: t = 1 | 0 |
| 3 | 1, 0 | SRI(s) = 1: t = 1<br>SRI(s) = 0: t = 0 | 1 |

In Table 7, the SRS #0 belongs to the first SRS resource set, and the value t associated with the SRS #0 is 0. Then, the values t associated with the SRS #0 whose index values of the SRI field are 0, 2, and 3 are all 0. The SRS #1 belongs to the second SRS resource set, and the value t associated with the SRS #1 is 1. Then, the values t associated with the SRS #1 whose index values of the SRI field are 1, 2, and 3 are all 1. With reference to Table 7, Table 8 is used as an example of calculating the accumulated TPC based on the value t. It is assumed that initial values of the accumulated TPC corresponding to the SRS #0 and the SRS #1 are both 0 dB.

TABLE 8

| | Index value of the SRI information | | | |
|---|---|---|---|---|
| | #0 | #1 | #2 | #3 |
| TPC adjustment amount | 1 dB | 3 dB | 1 dB | 3 dB |
| PUSCH transmission occasion | 0 | 1 | 2 | 3 |
| Accumulated TPC corresponding to an SRS#0 | 1 dB | 1 dB | 2 dB | 2 dB |
| Accumulated TPC corresponding to an SRS#1 | 0 dB | 3 dB | 3 dB | 6 dB |

As shown in Table 8, when the PUSCH transmission occasion is 3, the accumulated TPC corresponding to the SRS #0 whose associated value t is 0 is 2 dB, and the accumulated TPC corresponding to the SRS #1 whose associated value t is 1 is 6 dB.

When a total number of configured SRS resources is 4, a codebook-based SRI indication comparison table is shown in Table 9.

TABLE 9

| Number of configured SRS resources = 4 | |
|---|---|
| Index value of the SRI information | SRS resource number |
| 0 | 0 |
| 1 | 1 |
| 2 | 2 |
| 3 | 3 |
| 4 | 0, 2 |
| 5 | 0, 3 |
| 6 | 1, 2 |
| 7 | 1, 3 |
| 8 | 2, 0 |
| 9 | 3, 0 |
| 10 | 2, 1 |
| 11 | 3, 1 |
| 12 | 2, 3 |
| 13 | 0, 1 |
| 14 | 1, 0 |
| 15 | 3, 2 |

Table 9 may be understood with reference to Table 1. The index value of the SRI information in Table 9 is an index to which a bit field of the indication information #A is mapped. The bit field may be an SRI field. For example, when an index value of the SRI field is 0, a corresponding SRS resource is an SRS #0; or when the index value of the SRI field is 4, a corresponding SRS resource is an SRS #0 and an SRS #2. The radio access network device #A indicates the terminal device #A to select a transmit beam/transmit antenna group based on the SRS resource.

TABLE 9.1

| SRI information of codebook-based PUSCH transmission | |
|---|---|
| Index value of SRI information | SRS resource number |
| 0 | 0 |
| 1 | 1 |
| 2 | 2 |
| 3 | 3 |
| 4 | 0, 2 |

TABLE 9.1-continued

| SRI information of codebook-based PUSCH transmission | |
|---|---|
| Index value of SRI information | SRS resource number |
| 5 | 1, 3 |
| 6 | 2, 0 |
| 7 | 3, 1 |

In Table 9.1, the SRS resource set 0 includes the SRS resource 0 and the SRS resource 1, and the SRS resource set 1 includes the SRS resource 2 and the SRS resource 3. Numbers of SRS ports included in the SRS resource 0 and the SRS resource 2 are the same (for example, are four SRS ports). Numbers of SRS ports included in the SRS resource 1 and the SRS resource 3 are the same (for example, are two SRS ports).

The radio access network device #A may group the SRS resources. For example, when there are two TRPs, the SRS resources are grouped based on a number of TRPs. If the SRS #0 and the SRS #1 are configured as the first SRS resource set, the SRS #0 and the SRS #1 correspond to channels from the terminal device #A to a TRP #0. If the SRS #2 and the SRS #3 are configured as the second SRS resource set, the SRS #2 and the SRS #3 correspond to channels from the terminal device #A to a TRP #1. SRS transmit power may be independently determined for different SRS resource sets. When the index values are 0 to 3, it indicates that one TRP receives data sent by the terminal device #A. When the index values are 4 to 15, it indicates that two TRPs receive data sent by the terminal device #A. In Table 9, an order of SRS resources that belong to a same SRS resource set is not limited. In addition, an SRS resource which a TPC adjustment amount (which may also be referred to as a TPC indication value) corresponding to each index in the table corresponds to (acts on) may be agreed. For an agreed manner, refer to the foregoing manner c and manner d. Details are not described herein again.

The manner d is used as an example. After grouping the SRS resources, the radio access network device #A determines an index of the SRI field based on the SRS resource or the SRS resource set corresponding to the TPC adjustment amount, and generates the indication information #A based on the index and/or the TPC adjustment amount. For example, the radio access network device #A determines that the SRS resource is the SRS #0, and the SRS resource corresponding to the TPC adjustment amount is the SRS #0. Because the SRS #0 corresponds to the TRP #0, it may be understood that the TPC adjustment amount acts on the TRP #0. In this case, it may be determined, based on the SRS resource corresponding to the TPC adjustment amount, that the index value of the SRI field is 0. For another example, if the radio access network device #A determines that the SRS resource is the SRS #0 and the SRS #2, and the SRS resource set corresponding to the TPC adjustment amount is the first SRS resource set (the second SRS resource set). Because the SRS #0 belongs to the first SRS resource set (the SRS #2 belongs to the second SRS resource set), it may be determined that a rank of the SRS resource is the SRS #0 and then the SRS #2 (in other words, the $1^{st}$ SRS resource is the SRS #0, and the SRS #2 is prior to the SRS #0). It may be determined, based on the SRS resource corresponding to the TPC adjustment amount, that the corresponding index value of the SRI field is 4 (8).

Optionally, the radio access network device #A may configure a value t associated with the SRS resource, so that TPC values corresponding to SRS resources associated with a same value t may be accumulated. There is, for example, a manner C, a manner D, and a manner E.

Manner C

Each SRS resource is configured to be associated with one value t, as shown in Table 10. The value t is only an example, and does not constitute a limitation on this application. In this manner, a value t on which TPC acts and that corresponds to each index may be a specified value, that is, the value t is associated with the index value of the SRI information.

TABLE 10

| Index value of SRI information | SRS resource number | Value t | Value t on which TPC acts |
|---|---|---|---|
| 0 | 0 | 0 | 0 |
| 1 | 1 | 1 | 1 |
| 2 | 2 | 2 | 2 |
| 3 | 3 | 3 | 3 |
| 4 | 0, 2 | SRI(s) = 0: t = 0<br>SRI(s) = 2: t = 2 | 0 |
| 5 | 0, 3 | SRI(s) = 0: t = 0<br>SRI(s) = 3: t = 3 | 3 |
| 6 | 1, 2 | SRI(s) = 1: t = 1<br>SRI(s) = 2: t = 2 | 1 |
| 7 | 1, 3 | SRI(s) = 1: t = 1<br>SRI(s) = 3: t = 3 | 1 |
| 8 | 2, 0 | SRI(s) = 2: t = 2<br>SRI(s) = 0: t = 0 | 2 |
| 9 | 3, 0 | SRI(s) = 3: t = 3<br>SRI(s) = 0: t = 0 | 3 |
| 10 | 2, 1 | SRI(s) = 2: t = 2<br>SRI(s) = 1: t = 1 | 1 |
| 11 | 3, 1 | SRI(s) = 3: t = 3<br>SRI(s) = 1: t = 1 | 3 |
| 12 | 2, 3 | SRI(s) = 2: t = 2<br>SRI(s) = 3: t = 3 | 2 |
| 13 | 0, 1 | SRI(s) = 0: t = 0<br>SRI(s) = 1: t = 1 | 1 |
| 14 | 1, 0 | SRI(s) = 1: t = 1<br>SRI(s) = 0: t = 0 | 1 |
| 15 | 3, 2 | SRI(s) = 3: t = 3<br>SRI(s) = 2: t = 2 | 3 |

According to Table 10, accumulated TPC is calculated for each SRS resource. With reference to Table 10, Table 11 is used as an example of calculating the accumulated TPC based on the value t. It is assumed that initial values of the accumulated TPC corresponding to the SRS #0 and the SRS #1 are both 0 dB and an accumulation manner is, for example, a manner a.

Manner a

TABLE 11

| | Index value of SRI information | | | |
|---|---|---|---|---|
| | #0 | #2 | #5 | #11 |
| TPC adjustment amount | −1 dB | 1 dB | | 1 dB |
| PUSCH transmission occasion | 0 | 1 | 2 | 3 |
| Accumulated TPC corresponding to an SRS#0 | −1 dB | −1 dB | −1 dB | −1 dB |
| Accumulated TPC corresponding to an SRS#1 | 0 dB | 0 dB | 0 dB | 0 dB |
| Accumulated TPC corresponding to an SRS# 2 | 0 dB | 1 dB | 1 dB | 1 dB |
| Accumulated TPC corresponding to an SRS# 3 | 0 dB | 0 dB | 3 dB | 4 dB |

As shown in Table 11, when the PUSCH transmission occasion is 3, the accumulated TPC corresponding to the SRS #0 whose associated value t is 0 is −1 dB, the accumulated TPC corresponding to the SRS #1 whose associated value t is 1 is 0 dB, the accumulated TPC corresponding to the SRS #2 whose associated value t is 2 is 1 dB, and the accumulated TPC corresponding to the SRS #3 whose associated value t is 3 is 4 dB.

Manner D

SRS resources in a same resource set are configured to be associated with a same value t, as shown in Table 12. Values of the value t and the TPC adjustment amount are only examples, and do not constitute a limitation on this application. In this manner, the value t on which TPC acts and that corresponds to each index may be a value t corresponding to a prior SRS resource set (that is, the 1$^{st}$ SRS resource set) in an order, or a value t corresponding to a posterior SRS resource set in an order. The value t corresponding to the prior SRS resource set (that is, the 1$^{st}$ SRS resource set) in the order is used as an example, as shown in Table 12.

It should be understood that, in this embodiment, the index value of the SRI information may be further configured to be associated with the value t. For example, as shown in Table 10 and Table 12, the index values 0 to 3 of the SRI information are associated with different values t: 0 and 1. In this case, the index values 0 to 3 of the SRI information is the first index value, the index values 4 to 15 of the SRI information is the second index value, and group information associated with the index values 4 to 15 is determined based on the index values 0 to 3. Specifically, in the index values 4 to 15, the index value corresponding to the SRS resource 0 is determined based on group information associated with the index value 0, that is, t=0. The index value corresponding to the SRS resource 1 is determined based on group information associated with the index value 1, that is, t=0. By analogy, the index value may be obtained. In this case, the value t does not need to be explicitly configured for the index values 4 to 15.

Optionally, the second index value may also be explicitly associated with the value t. In this case, the value t is associated with only the first SRS resource set in a plurality of SRS resource sets indicated by the second index value. In other words, the value t may be explicitly configured for the index values 4 to 15. The value t corresponds to the first SRS resource set, for example, corresponds to an SRS resource set that is prior in an order.

TABLE 12

| Index value of SRI information | SRS resource number | Value t | Value t on which TPC acts |
|---|---|---|---|
| 0 | 0 | 0 | 0 |
| 1 | 1 | 0 | 0 |
| 2 | 2 | 1 | 1 |
| 3 | 3 | 1 | 1 |
| 4 | 0, 2 | SRI(s) = 0: t = 0<br>SRI(s) = 2: t = 1 | 0 |
| 5 | 0, 3 | SRI(s) = 0: t = 0<br>SRI(s) = 3: t = 1 | 0 |
| 6 | 1, 2 | SRI(s) = 1: t = 0<br>SRI(s) = 2: t = 1 | 1 |
| 7 | 1, 3 | SRI(s) = 1: t = 0<br>SRI(s) = 3: t = 1 | 1 |
| 8 | 2, 0 | SRI(s) = 2: t = 1<br>SRI(s) = 0: t = 0 | 1 |
| 9 | 3, 0 | SRI(s) = 3: t = 1<br>SRI(s) = 0: t = 0 | 1 |
| 10 | 2, 1 | SRI(s) = 2: t = 1<br>SRI(s) = 1: t = 0 | 1 |
| 11 | 3, 1 | SRI(s) = 3: t = 1<br>SRI(s) = 1: t = 0 | 1 |

TABLE 12-continued

| Index value of SRI information | SRS resource number | Value t | Value t on which TPC acts |
|---|---|---|---|
| 12 | 2, 3 | SRI(s) = 2: t = 1<br>SRI(s) = 3: t = 1 | 1 |
| 13 | 0, 1 | SRI(s) = 0: t = 0<br>SRI(s) = 1: t = 0 | 0 |
| 14 | 1, 0 | SRI(s) = 1: t = 0<br>SRI(s) = 0: t = 0 | 0 |
| 15 | 3, 2 | SRI(s) = 3: t = 1<br>SRI(s) = 2: t = 1 | 1 |

In Table 12, the SRS #0 and the SRS #1 belong to the first SRS resource set, and the values t associated with the SRS #0 and the SRS #1 whose index values of the SRI field are 0 to 15 are all 0. The SRS #2 and the SRS #3 belong to the second SRS resource set, and the values t associated with the SRS #2 and the SRS #3 whose index values of the SRI field are 0 to 15 are all 1.

According to Table 12, TPC values corresponding to SRS resources belonging to a same SRS resource set may be accumulated. With reference to Table 12, Table 13 is used as an example of calculating the accumulated TPC based on the value t. It is assumed that initial values of the accumulated TPC corresponding to the SRS #0 and the SRS #1 are both 0 dB and an accumulation manner is, for example, a manner b.

Manner b

TABLE 13

| | Index value of SRI information | | | |
|---|---|---|---|---|
| | #0 | #2 | #5 | #11 |
| TPC adjustment amount | −1 dB | 1 dB | −1 dB | 1 dB |
| PUSCH transmission occasion | 0 | 1 | 2 | 3 |
| Accumulated TPC corresponding to an SRS#0 | −1 dB | −1 dB | −2 dB | −2 dB |
| Accumulated TPC corresponding to an SRS#1 | −1 dB | −1 dB | −2 dB | −2 dB |
| Accumulated TPC corresponding to an SRS# 2 | 0 dB | 1 dB | 1 dB | 2 dB |
| Accumulated TPC corresponding to an SRS# 3 | 0 dB | 1 dB | 1 dB | 2 dB |

As shown in Table 13, when the PUSCH transmission occasion is 3, the accumulated TPC corresponding to the SRS #0 and the SRS #1 that are associated with a same value t is −2 dB, and the accumulated TPC corresponding to the SRS #2 and the SRS #3 that are associated with a same value t is 2 dB.

Manner E

The manner C and the manner D for configuring the value t are combined, that is, SRS resources in the first SRS resource set are associated with different values t, and SRS resources in the second SRS resource set are associated with a same value t, as shown in Table 14. Values of the value t are only examples, and do not constitute a limitation on this application. In this manner, a value t on which TPC acts and that corresponds to each index may be specified, or may be agreed on based on an order of the SRS resource sets. For example, the value t on which TPC acts and that corresponds to each index is specified, that is, the value t is associated with the index value of the SRI information, as shown in Table 14.

It should be understood that, in this embodiment, the index value of the SRI information may be further configured to be associated with the value t. For example, as shown in Table 14, the index values 0 to 3 of the SRI information are associated with different values t: 0, 1, and 2. In this case, the index values 0 to 3 of the SRI information is the first index value, the index values 4 to 15 of the SRI information is the second index value, and group information associated with the index values 4 to 15 is determined based on the index values 0 to 3. Specifically, in the index values 4 to 15, the index value corresponding to the SRS resource 0 is determined based on group information associated with the index value 0, that is, t=0. The index value corresponding to the SRS resource 1 is determined based on group information associated with the index value 1, that is, t=2. By analogy, the index value may be obtained. In this case, the value t does not need to be explicitly configured for the index values 4 to 15.

Optionally, the second index value may also be explicitly associated with the value t. In this case, the value t is associated with only the first SRS resource set in a plurality of SRS resource sets indicated by the second index value. In other words, the value t may be explicitly configured for the index values 4 to 15. The value t corresponds to the first SRS resource set, for example, corresponds to an SRS resource set that is prior in an order.

TABLE 14

| Index | SRI(s), N = 4 | Value t | Value t on which TPC acts |
|---|---|---|---|
| 0 | 0 | 0 | 0 |
| 1 | 1 | 2 | 2 |
| 2 | 2 | 1 | 1 |
| 3 | 3 | 1 | 1 |
| 4 | 0, 2 | SRI(s) = 0: t = 0<br>SRI(s) = 2: t = 1 | 0 |
| 5 | 0, 3 | SRI(s) = 0: t = 0<br>SRI(s) = 3: t = 1 | 0 |
| 6 | 1, 2 | SRI(s) = 1: t = 2<br>SRI(s) = 2: t = 1 | 2 |
| 7 | 1, 3 | SRI(s) = 1: t = 2<br>SRI(s) = 3: t = 1 | 2 |
| 8 | 2, 0 | SRI(s) = 2: t = 1<br>SRI(s) = 0: t = 0 | 1 |
| 9 | 3, 0 | SRI(s) = 3: t = 1<br>SRI(s) = 0: t = 0 | 1 |
| 10 | 2, 1 | SRI(s) = 2: t = 1<br>SRI(s) = 1: t = 0 | 1 |
| 11 | 3, 1 | SRI(s) = 3: t = 1<br>SRI(s) = 1: t = 0 | 1 |
| 12 | 2, 3 | SRI(s) = 2: t = 1<br>SRI(s) = 3: t = 1 | 1 |
| 13 | 0, 1 | SRI(s) = 0: t = 0<br>SRI(s) = 1: t = 0 | 0 |
| 14 | 1, 0 | SRI(s) = 1: t = 2<br>SRI(s) = 0: t = 0 | 2 |
| 15 | 3, 2 | SRI(s) = 3: t = 1<br>SRI(s) = 2: t = 1 | 1 |

In Table 14, the SRS #0 and the SRS #1 belong to the first SRS resource set, but the value t associated with the SRS #0 is 0, and the value t associated with the SRS #1 is 2. The values t associated with the SRS #0 whose index values of the SRI field are 0 to 15 are all 0. The values t associated with the SRS #1 whose index values of the SRI field are 0 to 15 are all 2. The SRS #2 and the SRS #3 belong to the second SRS resource set, and the values t associated with the SRS #2 and the SRS #3 whose index values of the SRI field are 0 to 15 are all 1. For calculation of the accumulated TPC, refer to the foregoing manner a and manner b for analogy. Details are not described herein again.

Manner 2: Non-Codebook-Based PUSCH Transmission

When a total number of configured SRS resources is 2 and a maximum number of PUSCH transmission layers is 1, a non-codebook-based SRI indication comparison table is shown in Table 5. For allocation of the resource set and the TPC calculation manner, refer to Table 6 (the manner A) and Table 7 (the manner B) in the manner 1.

When a total number of configured SRS resources is 4 and a maximum number of PUSCH transmission layers is 1, a non-codebook-based SRI indication comparison table is shown in Table 15. In this case, the number of transmission layers (Layer, denoted by L) corresponds to a number of SRS resources in an SRS resource set corresponding to the index value of the SRI field.

TABLE 15

| Number of configured SRS resources = 4, and maximum number of transmission layers = 1 | |
|---|---|
| Index value of SRI information | SRS resource number |
| 0 | 0 (L = 1) |
| 1 | 1 (L = 1) |
| 2 | 2 (L = 1) |
| 3 | 3 (L = 1) |
| 4 | 0, 2 (L = 1) |
| 5 | 0, 3 (L = 1) |
| 6 | 1, 2 (L = 1) |
| 7 | 1, 3 (L = 1) |
| 8 | 2, 0 (L = 1) |
| 9 | 3, 0 (L = 1) |
| 10 | 2, 1 (L = 1) |
| 11 | 3, 1 (L = 1) |

Table 15 may be understood with reference to Table 1. The index value of the SRI information in Table 15 is an index to which a bit field of the indication information #A is mapped. The bit field may be an SRI field. For example, when an index value of the SRI field is 0, a corresponding SRS resource is an SRS #0; or when the index value of the SRI field is 4, a corresponding SRS resource is an SRS #0 and an SRS #2. The radio access network device #A indicates the terminal device #A to select a transmit beam/transmit antenna group based on the SRS resource.

It should be understood that, when the SRI indicates the index values 4 to 11 in Table 15, the number of PUSCH transmission layers is 1, and a plurality of SRS resources correspond to different time-frequency resources of PUSCH. For example, when the SRI indicates the index value 4, a slot 1 occupied by the PUSCH corresponds to the SRS resource 0, and a slot 2 occupied by the PUSCH corresponds to the SRS resource 1.

The radio access network device #A may group the SRS resources. For example, when there are two TRPs, the SRS resources are grouped based on a number of TRPs. If the SRS #0 and the SRS #1 are configured as the first SRS resource set, the SRS #0 and the SRS #1 correspond to channels from the terminal device #A to a TRP #0. If the SRS #2 and the SRS #3 are configured as the second SRS resource set, the SRS #2 and the SRS #3 correspond to channels from the terminal device #A to a TRP #1. SRS transmit power may be independently determined for different SRS resource sets. When the index values are 0 to 3, it indicates that one TRP receives data sent by the terminal device #A. When the index values are 4 to 11, it indicates that two TRPs receive data sent by the terminal device #A. In Table 15, in SRS resources corresponding to the index value of the SRI information, only one SRS resource belongs to a same SRS resource set, which indicates that the maximum number of PUSCH transmission layers is 1. In Table 15, an order of SRS resources that belong to a same SRS resource set is not limited. In addition, an SRS resource on which a TPC adjustment amount (which may also be referred to as a TPC indication value) corresponding to each index in the table acts may be agreed. For an agreed manner, refer to the foregoing manner c and manner d. Details are not described herein again.

The manner d is used as an example. After grouping the SRS resources, the radio access network device #A determines an index of the SRI field based on the SRS resource or the SRS resource set corresponding to the TPC adjustment amount, and generates the indication information #A based on the index and/or the TPC adjustment amount. For example, when the number of transmission layers is 1, the radio access network device #A determines that the SRS resource is the SRS #0, and the SRS resource corresponding to the TPC adjustment amount is the SRS #0. Because the SRS #0 corresponds to the TRP #0, it may be understood that the TPC adjustment amount acts on the TRP #0. In this case, it may be determined, based on the SRS resource corresponding to the TPC adjustment amount, that the index value of the SRI field is 0. For another example, when the number of transmission layers is 1, if the radio access network device #A determines that the SRS resource is the SRS #0 and the SRS #2, and the SRS resource set corresponding to the TPC adjustment amount is the first SRS resource set (the second SRS resource set). Because the SRS #0 belongs to the first SRS resource set (the SRS #2 belongs to the second SRS resource set), it may be determined that a rank of the SRS resource is the SRS #0 and then the SRS #2 (in other words, the $1^{st}$ SRS resource is the SRS #0, and the $2^{nd}$ SRS resource is the SRS #2). It may be determined, based on the SRS resource corresponding to the TPC adjustment amount, that the corresponding index value of the SRI field is 4.

Optionally, the radio access network device #A may configure a value t associated with the SRS resource (or the SRS resource set), so that TPC values corresponding to SRS resources associated with a same value t may be accumulated. For a manner of configuring the value t, refer to the manner C, the manner D, and the manner E in the manner 1. For a corresponding accumulation manner of the TPC, refer to the manner a and the manner b in the manner 1. Details are not described herein again.

When a total number of configured SRS resources is 4 and a maximum number of PUSCH transmission layers is 2, a non-codebook-based SRI indication comparison table is shown in Table 16. In this case, the number of transmission layers corresponds to a number of SRS resources in an SRS resource set corresponding to the index value of the SRI field.

TABLE 16

| Number of configured SRS resources = 4, and maximum number of transmission layers = 2 | |
|---|---|
| Index value of SRI information | SRS resource number |
| 0 | 0 (L = 1) |
| 1 | 1 (L = 1) |
| 2 | 2 (L = 1) |
| 3 | 3 (L = 1) |
| 4 | 0, 1 (L = 2) |
| 5 | 2, 3 (L = 2) |

TABLE 16-continued

| Number of configured SRS resources = 4, and maximum number of transmission layers = 2 | |
|---|---|
| Index value of SRI information | SRS resource number |
| 6 | 0, 2 (L = 1) |
| 7 | 0, 3 (L = 1) |
| 8 | 1, 2 (L = 1) |
| 9 | 1, 3 (L = 1) |
| 10 | 0, 1, 2, 3 (L = 2) |
| 11 | 2, 0 (L = 1) |
| 12 | 3, 0 (L = 1) |
| 13 | 2, 1 (L = 1) |
| 14 | 3, 1 (L = 1) |
| 15 | 2, 3, 0, 1 (L = 2) |

Table 16 may be understood with reference to Table 1. The index value of the SRI information in Table 16 is an index to which a bit field of the indication information #A is mapped. The bit field may be an SRI field. For example, when an index value of the SRI field is 0, a corresponding SRS resource is an SRS #0; or when the index value of the SRI field is 4, a corresponding SRS resource is an SRS #0 and an SRS #1. The radio access network device #A indicates the terminal device #A to select a transmit beam/transmit antenna group based on the SRS resource.

The radio access network device #A may group the SRS resources. For example, when there are two TRPs, the SRS resources are grouped based on a number of TRPs. If the SRS #0 and the SRS #1 are configured as the first SRS resource set, the SRS #0 and the SRS #1 correspond to channels from the terminal device #A to a TRP #0. If the SRS #2 and the SRS #3 are configured as the second SRS resource set, the SRS #2 and the SRS #3 correspond to channels from the terminal device #A to a TRP #1. SRS transmit power may be independently determined for different SRS resource sets. When the index values are 0 to 5, it indicates that one TRP receives data sent by the terminal device #A. When the index values are 6 to 15, it indicates that two TRPs receive data sent by the terminal device #A. In Table 16, there are a maximum of two SRS resources in the SRS resource set indicated by the SRI index. Therefore, the maximum number of PUSCH transmission layers is 2. For example, when the index value is 4, both the SRS #0 and the SRS #1 belong to the first SRS resource set. Therefore, in this case, the number of PUSCH transmission layers is 2. For another example, when the index value is 11, the SRS #2 belongs to the second SRS resource set, the SRS #0 belongs to the first SRS resource set, and each resource set has only one SRS resource. Therefore, the number of PUSCH transmission layers is 1. In Table 16, an order of SRS resources that belong to a same SRS resource set is not limited. In addition, an SRS resource on which a TPC adjustment amount (which may also be referred to as a TPC indication value) corresponding to each index in the table acts may be agreed. For an agreed manner, refer to the foregoing manner c and manner d. Details are not described herein again.

The manner d is used as an example. After grouping the SRS resources, the radio access network device #A determines an index of the SRI field based on the SRS resource or the SRS resource set corresponding to the TPC adjustment amount, and generates the indication information #A based on the index and/or the TPC adjustment amount. For example, when the number of transmission layers is 1, the radio access network device #A determines that the SRS resource is the SRS #0, and the SRS resource corresponding to the TPC adjustment amount is the SRS #0. Because the SRS #0 corresponds to the TRP #0, it may be understood that the TPC adjustment amount acts on the TRP #0. In this case, it may be determined, based on the SRS resource corresponding to the TPC adjustment amount, that the index value of the SRI field is 0. For another example, when the number of transmission layers is 1, if the radio access network device #A determines that the SRS resource is the SRS #0 and the SRS #2, and the SRS resource set corresponding to the TPC adjustment amount is the first SRS resource set (the second SRS resource set). Because the SRS #0 belongs to the first SRS resource set (the SRS #2 belongs to the second SRS resource set), it may be determined that a rank of the SRS resource is the SRS #0 and then the SRS #2 (in other words, the 1$^{st}$ SRS resource is the SRS #0, and the 2$^{nd}$ SRS resource is the SRS #2). It may be determined, based on the SRS resource corresponding to the TPC adjustment amount, that the corresponding index value of the SRI field is 6.

Optionally, the radio access network device #A may configure a value t associated with the SRS resource, to indicate a corresponding TPC adjustment amount. The TPC adjustment amount corresponding to the SRS resources associated with the same value t may be accumulated. For a manner of configuring the value t, refer to the manner C, the manner D, and the manner E in the manner 1. For a corresponding accumulation manner of the TPC, refer to the manner a and the manner b in the manner 1. Details are not described herein again. When the value t is configured in the manner E in Table 16, values t configured for the SRS #0 and the SRS #1 that belong to a same SRS resource set may be different (values t configured for the SRS #2 and the SRS #3 may be different). This means that TPC adjustment amounts of uplink transmit power corresponding to the SRS #0 and the SRS #1 may be different. By analogy, another applicable manner in this embodiment of this application also falls within the protection scope of this application. Details are not described in other parts.

Optionally, the radio access network device #A may configure a value t associated with the SRS resource, so that TPC values corresponding to SRS resources associated with a same value t may be accumulated. For a manner of configuring the value t according to Table 16, refer to the manner C, the manner D, and the manner E in the manner 1. For a corresponding accumulation manner of the TPC, refer to the manner a and the manner b in the manner 1. In addition, the manner of configuring the value t may alternatively be: The value t is associated with some index values in the first index value set of the SRI information, and an SRS resource or an SRS resource set corresponding to another index value.

In a possible implementation, the radio access network device #A determines, based on the group information corresponding to the third index value in the first index value set, group information corresponding to a fourth index value in the first index value set. A number of SRS resource sets corresponding to the third index value is 1. A number of SRS resource sets corresponding to the fourth index value is greater than 1. Table 16.1 shows an example of a manner of configuring the value t.

It should be understood that, in this embodiment, the index value of the SRI information may be further configured to be associated with the value t. For example, as shown in Table 16.1, the index values 0 to 5 of the SRI information are associated with different values t: 0 to 3. In this case, the index values 0 to 5 of the SRI information is the first index value, the index values 6 to 15 of the SRI information is the second index value, and group information associated with the index values 6 to 15 is determined based on the index values 0 to 5. Specifically, in the index values 6 to 15, the index value corresponding to the SRS resource 0 is determined based on group information associated with the index value 0, that is, t=0. The index value corresponding to the SRS resources 0 and 1 is determined based on group information associated with the index value 4. By analogy, the index value may be obtained. In this case, the value t does not need to be explicitly configured for the index values 6 to 15.

Optionally, the second index value may also be explicitly associated with the value t. In this case, the value t is associated with only the first SRS resource set in a plurality of SRS resource sets indicated by the second index value. In other words, the value t may be explicitly configured for the index values 6 to 15. The value t corresponds to the first SRS resource set, for example, corresponds to an SRS resource set that is prior in an order.

TABLE 16.1

| Index value of SRI information | SRS resource number | Value t | Value t on which TPC acts |
|---|---|---|---|
| 0 | 0 (L = 1) | 0 | 0 |
| 1 | 1 (L = 1) | 0 | 0 |
| 2 | 2 (L = 1) | 1 | 1 |
| 3 | 3 (L = 1) | 1 | 1 |
| 4 | 0, 1 (L = 2) | 2 | 2 |
| 5 | 2, 3 (L = 2) | 3 | 3 |
| 6 | 0, 2 (L = 1) | SRI(s) = 0: t = 0<br>SRI(s) = 2: t = 1 | 0 |
| 7 | 0, 3 (L = 1) | SRI(s) = 0: t = 0<br>SRI(s) = 3: t = 1 | 0 |
| 8 | 1, 2 (L = 1) | SRI(s) = 1: t = 0<br>SRI(s) = 2: t = 1 | 1 |
| 9 | 1, 3 (L = 1) | SRI(s) = 1: t = 0<br>SRI(s) = 3: t = 1 | 1 |
| 10 | 0, 1, 2, 3 (L = 2) | SRI(s) = 0, 1: t = 2<br>SRI(s) = 2, 3: t = 3 | 2 |
| 11 | 2, 0 (L = 1) | SRI(s) = 2: t = 1<br>SRI(s) = 0: t = 0 | 1 |
| 12 | 3, 0 (L = 1) | SRI(s) = 3: t = 1<br>SRI(s) = 0: t = 0 | 1 |
| 13 | 2, 1 (L = 1) | SRI(s) = 2: t = 1<br>SRI(s) = 1: t = 0 | 1 |
| 14 | 3, 1 (L = 1) | SRI(s) = 3: t = 1<br>SRI(s) = 1: t = 0 | 1 |
| 15 | 2, 3, 0, 1 (L = 2) | SRI(s) = 2, 3: t = 3<br>SRI(s) = 0, 1 : t = 2 | 3 |

In Table 16.1, the SRS #0 and the SRS #1 belong to the first SRS resource set, and the SRS #2 and the SRS #3 belong to the second SRS resource set. In the index values 0 to 3, the values t associated with the SRS #0 and the SRS #1 are 0, in other words, the value t associated with the first SRS resource set is 0; the values t associated with the SRS #2 and the SRS #3 are 1, in other words, the value t associated with the second SRS resource set is 1. In the index values 6 to 9, and 11 to 14, a value t associated with each SRS resource is a value t of an SRS resource set to which the SRS resource belongs. If the SRS #0 and the SRS #1 in the index 4 belong to a same resource set, and the value t associated with the index 4 is 2, an SRS resource in the indices 10 and 15 and an SRS resource in the index 4 belong to a same resource set, and are associated with the same value t, namely, 2. Similarly, if the SRS #2 and the SRS #3 in the index 5 belong to a same resource set, and the value t associated with the index 5 is 3, an SRS resource in the indices 10 and 15 and an SRS resource in the index 5 belong to a same resource set, and are associated with the same value t, namely, 3. Optionally, as agreed, values t associated with the index 10 and the index 15 are values t corresponding to prior SRS resource sets. Therefore, the value t associated with the index 10 is 2, and the value t associated with the index 15 is 3. It should be understood that, in Table 16.1, the value t on which the TPC acts may be specified, that is, the value t is associated with the index value of the SRI information. Alternatively, the value t on which the TPC acts may be agreed based on an order of the SRS resources. A specific manner is described in the foregoing embodiment, and details are not described herein again.

When a total number of configured SRS resources is 8 and a maximum number of PUSCH transmission layers is 4, a non-codebook-based SRI indication comparison table is shown in Table 17. In this case, the number of transmission layers corresponds to a number of SRS resources in an SRS resource set corresponding to the index value of the SRI field.

TABLE 17

| Number of configured SRS resources = 8, and maximum number of transmission layers = 4 | |
|---|---|
| Index value of SRI information | SRS resource number |
| 0 | 0 (L = 1) |
| 1 | 1 (L = 1) |
| 2 | 2 (L = 1) |
| 3 | 3 (L = 1) |
| 4 | 0, 1 (L = 2) |
| 5 | 0, 2 (L = 2) |
| 6 | 0, 3 (L = 2) |
| 7 | 1, 2 (L = 2) |
| 8 | 1, 3 (L = 2) |
| 9 | 2, 3 (L = 2) |
| 10 | 0, 1, 2 (L = 3) |
| 11 | 0, 1, 3 (L = 3) |
| 12 | 0, 2, 3 (L = 3) |
| 13 | 1, 2, 3 (L = 3) |
| 14 | 0, 1, 2, 3 (L = 4) |
| 15 | 4 (L = 1) |
| 16 | 5 (L = 1) |
| 17 | 6 (L = 1) |
| 18 | 7 (L = 1) |
| 19 | 4, 5 (L = 2) |
| 20 | 4, 6 (L = 2) |
| 21 | 4, 7 (L = 2) |
| 22 | 5, 6 (L = 2) |
| 23 | 5, 7 (L = 2) |
| 24 | 6, 7 (L = 2) |
| 25 | 4, 5, 6 (L = 3) |
| 26 | 4, 5, 7 (L = 3) |
| 27 | 4, 6, 7 (L = 3) |
| 28 | 5, 6, 7 (L = 3) |
| 29 | 4, 5, 6, 7 (L = 4) |
| 30 | 0, 4 (L = 1) |
| . . . | . . . |
| 45 | 3, 7 (L = 1) |
| 46 | 0, 1, 4, 5 (L = 2) |
| . . . | . . . |
| 81 | 2, 3, 6, 7 (L = 2) |
| 82 | 0, 1, 2, 4, 5, 6 (L = 3) |
| . . . | . . . |
| 97 | 1, 2, 3, 5, 6, 7 (L = 3) |
| 98 | 0, 1, 2, 3, 4, 5, 6, 7 (L = 4) |
| 99 | 4, 0 (L = 1) |
| . . . | . . . |
| 114 | 7, 3 (L = 1) |
| 115 | 4, 5, 0, 1 (L = 2) |
| . . . | . . . |
| 150 | 6, 7, 2, 3 (L = 2) |
| 151 | 4, 5, 6, 0, 1, 2 (L = 3) |
| . . . | . . . |

TABLE 17-continued

| Number of configured SRS resources = 8, and maximum number of transmission layers = 4 | |
|---|---|
| Index value of SRI information | SRS resource number |
| 166 | 5, 6, 7, 1, 2, 3 (L = 3) |
| 167 | 4, 5, 6, 7, 0, 1, 2, 3 (L = 4) |

Table 17 may be understood with reference to Table 1. The index value of the SRI information in Table 17 is an index to which a bit field of the indication information #A is mapped. The bit field may be an SRI field. For example, when an index value of the SRI field is 0, a corresponding SRS resource is an SRS #0; or when the index value of the SRI field is 4, a corresponding SRS resource is an SRS #0 and an SRS #1. The radio access network device #A indicates the terminal device #A to select a transmit beam/transmit antenna group based on the SRS resource. When the index values are 30 to 45, the number of transmission layers is 1, and an SRS resource combination rule indicated by the SRI(s) is: Assuming that x belongs to the first SRS resource set {0, 1, 2, 3}, and y belongs to the second SRS resource set {4, 5, 6, 7}, a combination manner of SRS resources is (x, y). When the index values are 46 to 81, the number of transmission layers is 2, and an SRS resource combination rule indicated by the SRI(s) is: Assuming that x1 and x2 belong to the first SRS resource set {0, 1, 2, 3}, and y1 and y2 belong to the second SRS resource set {4, 5, 6, 7}, a combination manner of SRS resources is (x1, x2, y1, y2). When the index values are 82 to 97, the number of transmission layers is 3, and an SRS resource combination rule indicated by the SRI(s) is: Assuming that x1, x2, and x3 belong to the first SRS resource set {0, 1, 2, 3}, and y, y2, and y3 belong to the second SRS resource set {4, 5, 6, 7}, a combination manner of SRS resources is (x1, x2, x3, y1, y2, y3). When index values are 99 to 114, the number of transmission layers is 1, and an SRS resource combination rule indicated by SRI(s) is: Assuming that x belongs to the first SRS resource set {0, 1, 2, 3}, and y belongs to the second SRS resource set {4, 5, 6, 7}, a combination manner of SRS resources is (y, x). When the index values are 115 to 150, the number of transmission layers is 2, and an SRS resource combination rule indicated by the SRI(s) is: Assuming that x1 and x2 belong to the first SRS resource set {0, 1, 2, 3}, and y1 and y2 belong to the second SRS resource set {4, 5, 6, 7}, a combination manner of SRS resources is (y1, y2, x1, x2). When the index values are 151 to 166, the number of transmission layers is 3, and an SRS resource combination rule indicated by the SRI(s) is: Assuming that x1, x2, and x3 belong to the first SRS resource set {0, 1, 2, 3}, and y, y2, and y3 belong to the second SRS resource set {4, 5, 6, 7}, a combination manner of SRS resources is (y1, y2, y3, x1, x2, x3).

The radio access network device #A may group the SRS resources. For example, when there are two TRPs, the SRS resources are grouped based on a number of TRPs. If the SRS #0, the SRS #1, the SRS #2, and the SRS #3 are configured as the first SRS resource set (which is {0, 1, 2, 3} in Table 17). Then, the SRS #0, the SRS #1, the SRS #2, and the SRS #3 correspond to channels from the terminal device #A to a TRP #0. If the SRS #4, the SRS #5, the SRS #6, and the SRS #7 are configured as the second SRS resource set (which is {4, 5, 6, 7} in Table 17). Then, the SRS #4, the SRS #5, the SRS #6, and the SRS #7 correspond to channels from the terminal device #A to a TRP #1. SRS transmit power may be independently determined for different SRS resource sets. When the index values are 0 to 29, it indicates that one TRP receives data sent by the terminal device #A. When the index values are 30 to 167, it indicates that two TRPs receive data sent by the terminal device #A (SRS resources corresponding to each index include SRS resources in two SRS resource sets). In Table 17, there are a maximum of four SRS resources in the SRS resource set indicated by the SRI index. Therefore, the maximum number of PUSCH transmission layers is 4. For example, when the index value is 4, both the SRS #0 and the SRS #1 belong to the first SRS resource set. Therefore, in this case, the number of PUSCH transmission layers is 2. For another example, when the index value is 11, the SRS #0, the SRS #1, and the SRS #3 all belong to the first SRS resource set. Therefore, in this case, the number of PUSCH transmission layers is 3. In Table 17, an order of SRS resources that belong to a same SRS resource set is not limited.

In addition, an SRS resource on which a TPC adjustment amount (which may also be referred to as a TPC indication value) corresponding to each index in the table acts may be agreed. For an agreed manner, refer to the foregoing manner c and manner d. Details are not described herein again.

The manner d is used as an example. After grouping the SRS resources, the radio access network device #A determines an index of the SRI field based on the SRS resource or the SRS resource set corresponding to the TPC adjustment amount, and generates the indication information #A based on the index and/or the TPC adjustment amount. For example, when the number of transmission layers is 1, the radio access network device #A determines that the SRS resource is the SRS #0, and the SRS resource corresponding to the TPC adjustment amount is the SRS #0. Because the SRS #0 corresponds to the TRP #0, it may be understood that the TPC adjustment amount acts on the TRP #0. In this case, it may be determined, based on the SRS resource corresponding to the TPC adjustment amount, that the index value of the SRI field is 0. For another example, when the number of transmission layers is 1, if the radio access network device #A determines that the SRS resource is the SRS #0 and the SRS #4, and the SRS resource set corresponding to the TPC adjustment amount is the first SRS resource set (the second SRS resource set). Because the SRS #0 belongs to the first SRS resource set (the SRS #4 belongs to the second SRS resource set), it may be determined that a rank of the SRS resource is the SRS #0 and then the SRS #4 (in other words, the 1st SRS resource is the SRS #0, and the 2nd SRS resource is the SRS #4). It may be determined, based on the SRS resource corresponding to the TPC adjustment amount, that the corresponding index value of the SRI field is 30.

Optionally, the radio access network device #A may configure a value t associated with the SRS resource, to indicate a corresponding TPC adjustment amount. The TPC adjustment amount corresponding to the SRS resources associated with the same value t may be accumulated. For a manner of configuring the value t, refer to the manner C, the manner D, and the manner E in the manner 1. For a corresponding accumulation manner of the TPC, refer to the manner a and the manner b in the manner 1. Details are not described herein again.

Optionally, when the accumulation manner of the TPC is the manner a, if there are two or more SRS resources in an SRS resource set corresponding to one index, all SRS resources in an SRS resource set corresponding to a TRP are adjusted based on a TPC adjustment amount, where the TRP corresponds to the TPC adjustment amount corresponding to the index.

It should be understood that a grouping manner of SRS resources and an order of SRS resources in each group are not limited in this embodiment of this application.

It should be understood that Table 5 to Table 17 are only examples for description, and other concepts or rules that are the same as those in this embodiment of this application shall fall within the protection scope of this application.

In S120, the radio access network device #A sends the SRI information #A1 and the TPC indication information #A2 to the terminal device #A, and the terminal device #A receives the SRI information #A1 and the TPC indication information #A2.

In S130, the terminal device #A determines, based on the SRI information #A1 and the TPC indication information #A2, the SRS resource, the TRP corresponding to the TPC adjustment amount, and the transmit power for sending the uplink data to the TRP.

Specifically, in the codebook-based transmission mode, the terminal device #A determines the index value of the SRI field and the TPC adjustment amount based on the indication information #A, and determines a to-be-searched table based on the number of configured SRS resources, for example, Table 5 or Table 9 in S410. It is assumed that two SRS resources, namely the SRS #0 and the SRS #1, are configured for the terminal device #A, the SRS #0 corresponds to a channel of the TRP #0, and the SRS #1 corresponds to a channel of the TRP #1, the terminal device #A determines, based on the index, that corresponding SRS resources in the table are the SRS #0 and the SRS #1, and determines, based on an agreement, that an SRS resource corresponding to the TPC adjustment amount corresponding to the index is the SRS #0. In this case, the terminal device #A adjusts, based on the TPC adjustment amount, power for sending data to the TRP #1. For an agreed manner, refer to the manner c and the manner din S110.

The manner d is used as an example. If SRS resources corresponding to the index belong to a same SRS resource set, the terminal device #A may adjust the uplink transmit power of the SRS resource set based on the TPC adjustment amount. If the SRS resources corresponding to the index belong to two SRS resource sets (the first SRS resource set and the second SRS resource set), the terminal device #A may use all or some SRS resources in the prior SRS resource set (that is, the $1^{st}$ SRS resource set) in an order as SRS resources corresponding to the TPC adjustment amount. When sending corresponding data, the terminal device #A may use the TPC adjustment amount to adjust transmit power of the corresponding data. Optionally, the terminal device #A may further determine, based on the manner of associating the value t in the manner A, the manner B, the manner C, the manner D, or the manner E described in S110, a TRP corresponding to an SRS resource set whose uplink transmit power is to be adjusted and/or transmit power of uplink data corresponding to all or some SRS resources in the SRS resource set, and calculate an accumulated value of the TPC adjustment amount with reference to the manner a or the manner b.

Specifically, in the non-codebook-based transmission mode, the terminal device #A determines the index value of the SRI field and the TPC adjustment amount based on the indication information #A, and determines a to-be-searched table based on the number of configured SRS resources and the maximum number of PUSCH transmission layers, for example, Table 15, Table 16 or Table 17 in S110. It is assumed that two SRS resources, namely the SRS #0 and the SRS #1, are configured for the terminal device #A, the SRS #0 corresponds to a channel of the TRP #0, and the SRS #1 corresponds to a channel of the TRP #1, the terminal device #A determines, based on the index, that corresponding SRS resources in the table are the SRS #0 and the SRS #1, and determines, based on an agreement, that an SRS resource corresponding to the TPC adjustment amount corresponding to the index is the SRS #0. In this case, the terminal device #A adjusts, based on the TPC adjustment amount, power for sending data to the TRP #1. For an agreed manner, refer to the manner c and the manner d in S110.

The manner d is used as an example. If SRS resources corresponding to the index belong to a same SRS resource set, the terminal device #A may adjust the uplink transmit power of the SRS resource set based on the TPC adjustment amount. If the SRS resources corresponding to the index belong to two SRS resource sets (the first SRS resource set and the second SRS resource set), the terminal device #A may use all or some SRS resources in the prior SRS resource set (that is, the $1^{st}$ SRS resource set) in an order as SRS resources corresponding to the TPC adjustment amount. When sending corresponding data, the terminal device #A may use the TPC adjustment amount to adjust transmit power of the corresponding data. Optionally, the terminal device #A may further determine, based on the manner of associating the value t in the manner A, the manner B, the manner C, the manner D, or the manner E described in S110, a TRP corresponding to an SRS resource set whose uplink transmit power is to be adjusted and/or transmit power of uplink data corresponding to all or some SRS resources in the SRS resource set, and calculate an accumulated value of the TPC adjustment amount with reference to the manner a or the manner b.

Figure 5:
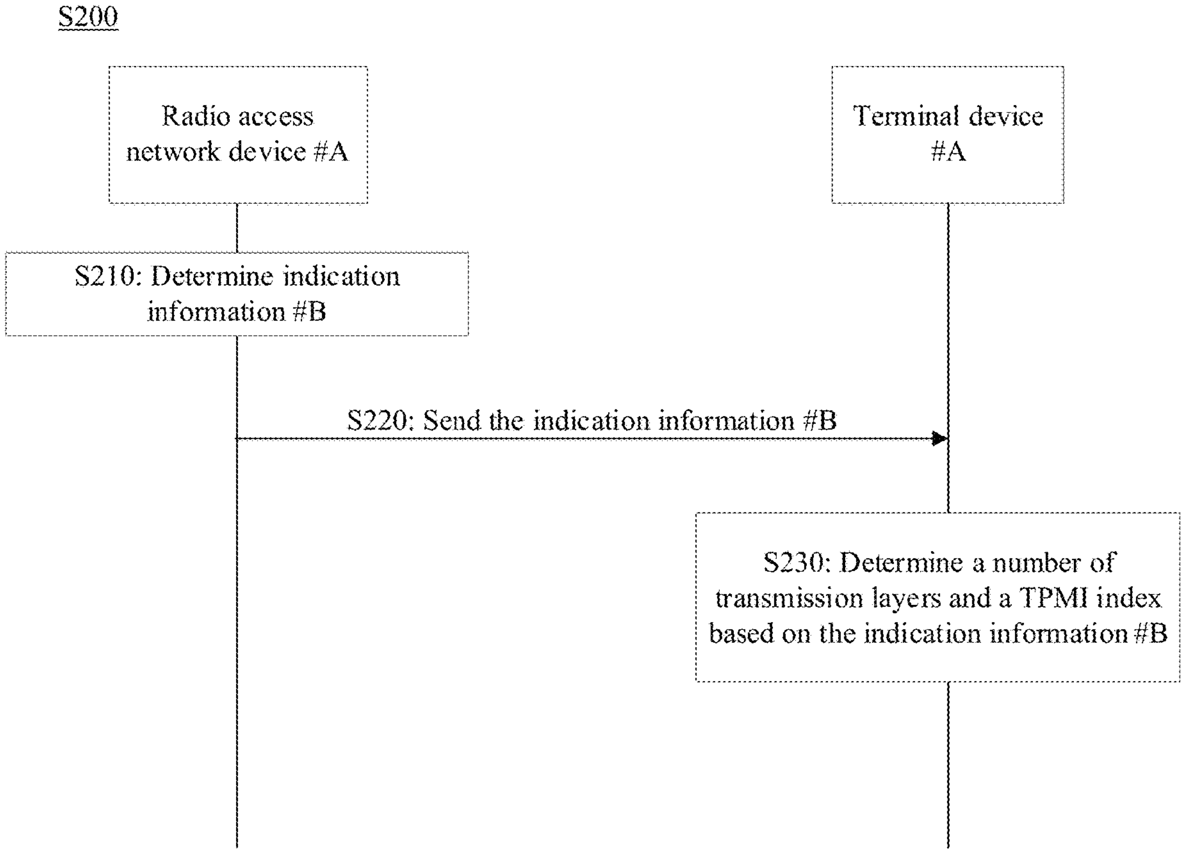
FIG. 5 is a schematic interaction diagram of another example of an indication method according to this application.

FIG. 5 is a schematic flowchart of an indication method 200 according to this application.

In S210, a radio access network device #A determines indication information #B, where the indication information #B indicates two TPMI indices and a number of PUSCH transmission layers.

Two TPMIs corresponding to each index value in the indication information #B have the following features:

Dimensions (a number of rows and a number of columns) and coherence types of precoding matrices that are indicated by the TPMIs are the same; and/or locations of non-zero elements in the precoding matrices that are indicated by the TPMIs are the same.

Specifically, the coherence types of the precoding matrix (a codeword) include: noncoherent, partially coherent, and completely coherent. The noncoherent type means that only one non-zero power antenna port is used for one layer PUSCH transmission, that is, each column of the precoding matrix has only one non-zero element. The partially coherent type means that some non-zero power antenna ports are used for one layer PUSCH transmission, that is, only some elements in each column of the precoding matrix are non-zero elements. The fully coherent type means that all antenna ports at each layer of PUSCH, have non-zero power, that is, all elements in each column of the precoding matrix are non-zero elements.

Optionally, the two TPMIs correspond to different time-frequency resources of the PUSCH. For example, a slot 1 occupied by the PUSCH corresponds to a TPMI 1, and a slot 2 occupied by the PUSCH corresponds to a TPMI 2. That is, a precoding matrix for PUSCH transmission in the slot 1 is determined based on the TPMI 1, and a precoding matrix for PUSCH transmission in the slot 2 is determined based on the TPMI 2.

Optionally, non-zero antenna ports indicated by the two TPMIs are the same.

This manner can reduce DCI overheads. Specifically, when transmit antennas of the terminal device corresponding to the two TPMIs indicated by the indication information #B are the same, there is a relatively high probability that antenna ports selected by the two TPMIs for PUSCH transmission are the same. Therefore, a number of combinations of the two TPMIs can be reduced by using the correlation.

Optionally, the radio access network device #A sends codebook subset configuration information A or B. The codebook subset configuration information A indicates that the coherence types of precoding matrices indicated by the TPMIs are the same. The codebook subset configuration information B indicates that the locations of non-zero elements in the precoding matrices indicated by the TPMIs are the same.

Specifically, when the radio access network device #A configures two SRS resources for the terminal device #A, and the two SRS resources correspond to different TRPs, a combination manner of the two precoding matrices may be determined based on a feature #A (a coherence type) of a precoding matrix for sending PUSCH data. The feature #A includes any one of the following:

Feature #A1: Numbers of transmission layers of the precoding matrices indicated by two TPMIs are the same, and numbers of antenna ports for sending data corresponding to the precoding matrices indicated by the two TPMIs are the same, that is, numbers of non-zero elements in corresponding columns (columns at a same location) of the two precoding matrices are the same. In other words, sizes of the two precoding matrices are both M*N (M is a number of rows, N is a number of columns), 0≤m<M, and 0≤n<N. In this case, numbers of non-zero elements in an $n^{th}$ column of the two precoding matrices are the same. For example, in Table 3, numbers of non-zero elements in a first column of the two precoding matrices whose TPMI indices are 0 and 1 are 1. Then, it is considered that numbers of antenna ports for sending data corresponding to the two precoding matrices are the same.

Feature #A2: Waveforms and numbers of transmission layers of the precoding matrices indicated by two TPMIs are the same, and locations of antenna ports for sending data corresponding to the precoding matrices indicated by the two TPMIs are the same, that is, locations of non-zero elements in corresponding columns (columns at a same location) of the two precoding matrices are the same. In other words, sizes of the two precoding matrices are both M*N (M is a number of rows, N is a number of columns), 0≤m<M, and 0≤n<N. In this case, numbers of non-zero elements in an $n^{th}$ column of the two precoding matrices are the same, and row numbers m in which the non-zero elements are located are also the same. For example, in Table 3, locations of non-zero elements in a first column of the four precoding matrices whose TPMI indices are 2, 3, 4, and 5 are the same, and are located in a first row and a second row. Then, it is considered that locations of antenna ports for sending data corresponding to the two precoding matrices are the same.

For example, based on the feature #A2, a correspondence between the combination manner of the two precoding matrices for sending the PUSCH data and the TPMI index and/or a number of PUSCH transmission layers may be shown in Table 18 to Table 23.

It is assumed that a number of antenna ports is 2, and a maximum number of transmission layers is 2. Based on the feature that the locations of the non-zero elements in the corresponding columns (columns at the same location) of the two precoding matrices are the same, when codebook subset=non-correlated, two same precoding matrices may be configured, as shown in Table 18.

TABLE 18

| Number of antenna ports = 2, and maximum number of transmission layers = 2 | |
|---|---|
| Index value of a precoding matrix and a number of transmission layers | Codebook subset = noncoherent (codebookSubset = nonCoherent) |
| 0 | 1 layer: TPMI = 0, TPMI = 0 |
| 1 | 1 layer: TPMI = 1, TPMI = 1 |
| 2 | 2 layers: TPMI = 0, TPMI = 0 |
| 3 | Reserved |

The index value of the precoding matrix and the number of transmission layers in Table 18 is an index to which a bit field of the indication information #B is mapped. The bit field may be the SRI field. The "codebook subset" may be carried in radio resource control (RRC) signaling, and indicates a configuration of the codebook subset. In the configuration Table 18, for example, when the index value is 0, it indicates that precoding matrices for sending PUSCH data to two TRPs are both precoding matrices whose number of antenna ports is 2, number of transmission layers is 1, and TPMI index is 0. When the index value is 3, it indicates that precoding matrices for sending PUSCH data to two TRPs are both precoding matrices whose number of antenna ports is 2, number of transmission layers is 2, and TPMI index is 0.

It is assumed that a number of antenna ports is 4, and a number of transmission layers is 1. Based on the feature that the locations of the non-zero elements in the corresponding columns (columns at the same location) of the two precoding matrices are the same, when codebook subset=non-correlated, two same precoding matrices may be configured, as shown in Table 19.

TABLE 19

| Number of antenna ports = 4, and maximum number of transmission layers = 1 | |
|---|---|
| Index value of a precoding matrix and a number of transmission layers | Codebook subset = noncoherent |
| 0 | 1 layer: TPMI = 0, TPMI = 0 |
| 1 | 1 layer: TPMI = 1, TPMI = 1 |
| 2 | 1 layer: TPMI = 2, TPMI = 2 |
| 3 | 1 layer: TPMI = 3, TPMI = 3 |

The index value of the precoding matrix and the number of transmission layers in Table 19 is an index to which a bit field of the indication information #B is mapped. The bit field may be the SRI field. The "codebook subset" may be carried in radio resource control (RRC) signaling, and indicates a configuration of the codebook subset. For interpretation of Table 19, refer to the related descriptions of Table 18.

It is assumed that a number of antenna ports is 4, and a maximum number of transmission layers is 4. Based on the feature that the locations of the non-zero elements in the corresponding columns (columns at the same location) of the two precoding matrices are the same, when codebook subset=non-correlated, two same precoding matrices may be configured, as shown in Table 20.

TABLE 20

| Number of antenna ports = 4, and maximum number of transmission layers = 4 | |
|---|---|
| Index value of a precoding matrix and a number of transmission layers | Codebook subset = noncoherent |
| 0 | 1 layer: TPMI = 0, TPMI = 0 |
| 1 | 1 layer: TPMI = 1, TPMI = 1 |
| 2 | 1 layer: TPMI = 2, TPMI = 2 |
| 3 | 1 layer: TPMI = 3, TPMI = 3 |
| 4 | 2 layers: TPMI = 0, TPMI = 0 |
| 5 | 2 layers: TPMI = 1, TPMI = 1 |
| 6 | 2 layers: TPMI = 2, TPMI = 2 |
| 7 | 2 layers: TPMI = 3, TPMI = 3 |
| 8 | 2 layers: TPMI = 4, TPMI = 4 |
| 9 | 2 layers: TPMI = 5, TPMI = 5 |
| 10 | 3 layers: TPMI = 0, TPMI = 0 |
| 11 | 4 layers: TPMI = 0, TPMI = 0 |
| 12-15 | Reserved |

The index value of the precoding matrix and the number of transmission layers in Table 20 is an index to which a bit field of the indication information #B is mapped. The bit field may be the SRI field. The “codebook subset” may be carried in radio resource control (RRC) signaling, and indicates a configuration of the codebook subset. For interpretation of Table 20, refer to the related descriptions of Table 18.

It is assumed that a number of antenna ports is 4, and a maximum number of transmission layers is 1. Based on the feature that the locations of the non-zero elements in the corresponding columns (columns at the same location) of the two precoding matrices are the same, when codebook subset=partially-coherent and noncoherent, two same precoding matrices may be configured, as shown in Table 21.

TABLE 21

| Number of antenna ports = 4, and maximum number of transmission layers = 1 | |
|---|---|
| Index value of a precoding matrix and a number of transmission layers | Codebook subset = partially and noncoherent |
| 0 | 1 layer: TPMI = 0, TPMI = 0 |
| 1 | 1 layer: TPMI = 1, TPMI = 1 |
| 2 | 1 layer: TPMI = 2, TPMI = 2 |
| 3 | 1 layer: TPMI = 3, TPMI = 3 |
| 4 | 1 layer: TPMI = 4, TPMI = 4 |
| 5 | 1 layer: TPMI = 5, TPMI = 5 |
| 6 | 1 layer: TPMI = 6, TPMI = 6 |
| 7 | 1 layer: TPMI = 7, TPMI = 7 |
| 8 | 1 layer: TPMI = 8, TPMI = 8 |
| 9 | 1 layer: TPMI = 9, TPMI = 9 |
| 10 | 1 layer: TPMI = 10, TPMI = 10 |
| 11 | 1 layer: TPMI = 11, TPMI = 11 |
| 12 | 1 layer: TPMI = 4, TPMI = 5 |
| 13 | 1 layer: TPMI = 4, TPMI = 6 |
| 14 | 1 layer: TPMI = 4, TPMI = 7 |
| 15 | 1 layer: TPMI = 5, TPMI = 4 |
| 16 | 1 layer: TPMI = 5, TPMI = 6 |
| 17 | 1 layer: TPMI = 5, TPMI = 7 |
| 18 | 1 layer: TPMI = 6, TPMI = 4 |

TABLE 21-continued

| Number of antenna ports = 4, and maximum number of transmission layers = 1 | |
|---|---|
| Index value of a precoding matrix and a number of transmission layers | Codebook subset = partially and noncoherent |
| 19 | 1 layer: TPMI = 6, TPMI = 5 |
| 20 | 1 layer: TPMI = 6, TPMI = 7 |
| 21 | 1 layer: TPMI = 8, TPMI = 9 |
| 22 | 1 layer: TPMI = 8, TPMI = 10 |
| 23 | 1 layer: TPMI = 8, TPMI = 11 |
| 24 | 1 layer: TPMI = 9, TPMI = 8 |
| 25 | 1 layer: TPMI = 9, TPMI = 10 |
| 26 | 1 layer: TPMI = 9, TPMI = 11 |
| 27 | 1 layer: TPMI = 10, TPMI = 8 |
| 28 | 1 layer: TPMI = 10, TPMI = 9 |
| 29 | 1 layer: TPMI = 10, TPMI = 11 |

The index value of the precoding matrix and the number of transmission layers in Table 21 is an index to which a bit field of the indication information #B is mapped. The bit field may be the SRI field. The “codebook subset” may be carried in radio resource control (RRC) signaling, and indicates a configuration of the codebook subset. In the configuration table 21, for example, when the index value is 0, it indicates that precoding matrices for sending PUSCH data to two TRPs are both precoding matrices whose number of antenna ports is 4, number of transmission layers is 1, and TPMI index is 0. When the index value is 12, it indicates that precoding matrices for sending PUSCH data to two TRPs are both precoding matrices whose number of antenna ports is 4, number of transmission layers is 1, and TPMI indices are 4 and 5. Locations of non-zero elements of the two precoding matrices are the same.

It is assumed that a number of antenna ports is 4, a maximum number of transmission layers is 4, and numbers of transmission layers includes 2 and 3. Based on the feature that the locations of the non-zero elements in the corresponding columns (“corresponding columns” herein means $n^h$ columns) of the two precoding matrices are the same (“locations are the same” herein means the non-zero elements are all located in an $m^{th}$ row and an $n^{th}$ column), when codebook subset=partially-coherent and noncoherent, two same precoding matrices may be configured, as shown in Table 22.

TABLE 22

| Number of antenna ports = 4, and maximum number of transmission layers = 4 | |
|---|---|
| Index value of a precoding matrix and a number of transmission layers | Codebook subset = partially and noncoherent |
| 0 | 1 layer: TPMI = 0, TPMI = 0 |
| 1 | 1 layer: TPMI = 1, TPMI = 1 |
| 2 | 1 layer: TPMI = 2, TPMI = 2 |
| 3 | 1 layer: TPMI = 3, TPMI = 3 |
| 4 | 1 layer: TPMI = 4, TPMI = 4 |
| 5 | 1 layer: TPMI = 5, TPMI = 5 |
| 6 | 1 layer: TPMI = 6, TPMI = 6 |
| 7 | 1 layer: TPMI = 7, TPMI = 7 |
| 8 | 1 layer: TPMI = 8, TPMI = 8 |
| 9 | 1 layer: TPMI = 9, TPMI = 9 |
| 10 | 1 layer: TPMI = 10, TPMI = 10 |
| 11 | 1 layer: TPMI = 11, TPMI = 11 |
| 12 | 2 layers: TPMI = 0, TPMI = 0 |
| 13 | 2 layers: TPMI = 1, TPMI = 1 |

TABLE 22-continued

| Number of antenna ports = 4, and maximum number of transmission layers = 4 | |
|---|---|
| Index value of a precoding matrix and a number of transmission layers | Codebook subset = partially and noncoherent |
| 14 | 2 layers: TPMI = 2, TPMI = 2 |
| 15 | 2 layers: TPMI = 3, TPMI = 3 |
| 16 | 2 layers: TPMI = 4, TPMI = 4 |
| 17 | 2 layers: TPMI = 5, TPMI = 5 |
| 18 | 2 layers: TPMI = 6, TPMI = 6 |
| 19 | 2 layers: TPMI = 7, TPMI = 7 |
| 20 | 2 layers: TPMI = 8, TPMI = 8 |
| 21 | 2 layers: TPMI = 9, TPMI = 9 |
| 22 | 2 layers: TPMI = 10, TPMI = 10 |
| 23 | 2 layers: TPMI = 11, TPMI = 11 |
| 24 | 2 layers: TPMI = 12, TPMI = 12 |
| 25 | 2 layers: TPMI = 13, TPMI = 13 |
| 26 | 3 layers: TPMI = 0, TPMI = 0 |
| 27 | 3 layers: TPMI = 1, TPMI = 1 |
| 28 | 3 layers: TPMI = 2, TPMI = 2 |
| 29 | 4 layers: TPMI = 0, TPMI = 0 |
| 30 | 4 layers: TPMI = 1, TPMI = 1 |
| 31 | 4 layers: TPMI = 2, TPMI = 2 |
| 32 | 1 layer: TPMI = 4, TPMI = 5 |
| ... | ... |
| 40 | 1 layer: TPMI = 6, TPMI = 7 |
| 41 | 2 layers: TPMI = 6, TPMI = 7 |
| ... | ... |
| 96 | 2 layers: TPMI = 12, TPMI = 13 |
| 97 | 3 layers: TPMI = 1, TPMI = 2 |
| 98 | 3 layers: TPMI = 2, TPMI = 1 |
| 99 | 4 layers: TPMI = 1, TPMI = 2 |
| 100 | 4 layers: TPMI = 2, TPMI = 1 |

The index value of the precoding matrix and the number of transmission layers in Table 22 is an index to which a bit field of the indication information #B is mapped. The bit field may be the SRI field. The "codebook subset" may be carried in radio resource control (RRC) signaling, and indicates a configuration of the codebook subset. In the configuration table 22, for example, when the index value is 0, it indicates that precoding matrices for sending PUSCH data to two TRPs are both precoding matrices whose number of antenna ports is 4, number of transmission layers is 1, and TPMI index is 0. When the index value is 32, it indicates that precoding matrices for sending PUSCH data to two TRPs are both precoding matrices whose number of antenna ports is 4, number of transmission layers is 1, and TPMI indices are 4 and 5. Locations of non-zero elements of the two precoding matrices are the same.

It is assumed that a number of antenna ports is 4, and a maximum number of transmission layers is 1. Based on the feature that the locations of the non-zero elements in the corresponding columns ("corresponding columns" herein means $n^{th}$ columns) of the two precoding matrices are the same ("locations are the same" herein means the non-zero elements are all located in an $m^{th}$ row and an $n^{th}$ column), when codebook subset=fully-coherent, partially-coherent and noncoherent, two same precoding matrices may be configured, as shown in Table 23.

TABLE 23

| Number of antenna ports = 4, and maximum number of transmission layers = 1 | |
|---|---|
| Index value of a precoding matrix and a number of transmission layers | Codebook subset = partially and noncoherent |
| 0 | 1 layer: TPMI = 0, TPMI = 0 |
| 1 | 1 layer: TPMI = 1, TPMI = 1 |
| ... | ... |
| 27 | 1 layer: TPMI = 27, TPMI = 27 |
| 28 | 1 layer: TPMI = 4, TPMI = 5 |
| 29 | 1 layer: TPMI = 4, TPMI = 6 |
| 30 | 1 layer: TPMI = 4, TPMI = 7 |
| 31 | 1 layer: TPMI = 5, TPMI = 4 |
| 32 | 1 layer: TPMI = 5, TPMI = 6 |
| 33 | 1 layer: TPMI = 5, TPMI = 7 |
| 34 | 1 layer: TPMI = 6, TPMI = 4 |
| 35 | 1 layer: TPMI = 6, TPMI = 5 |
| 36 | 1 layer: TPMI = 6, TPMI = 7 |
| 37 | 1 layer: TPMI = 12, TPMI = 13 |
| ... | ... |
| 276 | 1 layer: TPMI = 27, TPMI = 26 |

The index value of the precoding matrix and the number of transmission layers in Table 23 is an index to which a bit field of the indication information #B is mapped. The bit field may be the SRI field. The "codebook subset" may be carried in radio resource control (RRC) signaling, and indicates a configuration of the codebook subset. In Table 23, the index values 0 to 27 respectively indicate the corresponding TPMI indices 0 to 27. The index values 37 to 276 indicate TPMI indices obtained by removing 16 cases in which indices are the same from all combinations of every two TPMI indices 12-27. That is, there are 16*16=256 combinations in total, and 16 combinations with the same indices, for example, "TPMI=12, TPMI=12"; "TPMI=13, TPMI=13". Therefore, the index values 37 to 276 correspond to 240 combinations of TPMI indices. Details are not described herein again. In the configuration table 23, for example, when the index value is 0, it indicates that precoding matrices for sending PUSCH data to two TRPs are both precoding matrices whose number of antenna ports is 4, number of transmission layers is 1, and TPMI index is 0. For another example, when the index value is 28, it indicates that precoding matrices for sending PUSCH data to two TRPs are both precoding matrices whose number of antenna ports is 4, number of transmission layers is 1, and TPMI indices are 4 and 5. Locations of non-zero elements of the two precoding matrices are the same.

In S220, the radio access network device #A sends the indication information #B to the terminal device #A, and the terminal device #A receives the indication information #B.

In S230, the terminal device #A determines a corresponding number of transmission layers and a corresponding TPMI index based on the index value of the precoding matrix and the number of transmission layers in the indication information #B, and obtains a corresponding precoding matrix by searching a table based on the TPMI index and the number of transmission layers.

Specifically, the terminal device #A determines, based on the index in the indication information #B by searching the table, for example, Table 18 to Table 23, numbers of PUSCH transmission layers and TPMI indices that correspond to the two TRPs. Then, the terminal device #A determines, based on the TPMI indices by searching a table, precoding matrices corresponding to the two TRPs. The table indicates a correspondence between the TPMI index and the precoding matrix and is for example, Table 6.3.1.5-1: Precoding matrix W for single-layer transmission using two antenna ports (Precoding matrix W for single-layer transmission using two antenna ports).

It should be understood that "the terminal device #A searches a table" in this application is only a form in which the terminal device #A searches for an index (an index value of SRI information, and the index value of the precoding matrix and the number of transmission layers), and an SRS resource number or other information. A form in which the correspondence is represented is not limited in this application.

The foregoing describes the indication method according to this embodiment of this application with reference to FIG. 4 and FIG. 5. The following describes a device according to an embodiment of this application with reference to FIG. 6 to FIG. 9.

Figure 6:
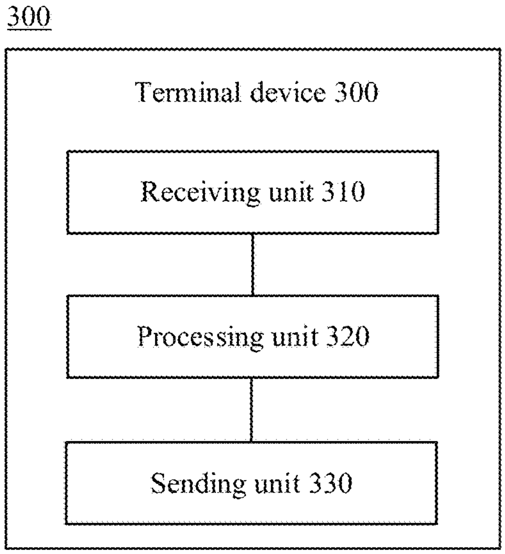
FIG. 6 is a schematic block diagram of an example of a terminal device according to an embodiment of this application.

FIG. 6 is a schematic block diagram of an example of a terminal device according to an embodiment of this application. As shown in FIG. 6, the terminal device 300 includes: a receiving unit 310, configured to receive an SRS resource indication SRI, where an index value included in the SRI belongs to a first index value set, the first index value set includes a first index value and a second index value, the first index value and the second index value correspond to a plurality of same SRS resources, and the first index value and the second index value correspond to different SRS resource sets for which power is to be adjusted; and a sending unit 330, configured to send physical uplink shared channel PUSCH data based on the SRI.

In a possible implementation, the SRI includes the first index value or the second index value. The receiving unit 310 is further configured to receive transmit power control TPC indication information, where the TPC indication information is used to adjust transmit power of PUSCH transmission corresponding to the first SRS resource set in the plurality of SRS resource sets, and the first SRS resource set is one of the plurality of SRS resource sets. The terminal device further includes a processing unit 320, configured to determine the first SRS resource set based on the SRI, where the first index value and the second index value correspond to different first SRS resource sets.

In a possible implementation, the first index value and the second index value correspond to different 1st SRS resources. The first SRS resource is an SRS resource set to which the 1st SRS resource belongs.

In a possible implementation, the plurality of SRS resource sets further include a second SRS resource set. The first SRS resource set and the second SRS resource set correspond to different time domain elements of the PUSCH.

In a possible implementation, the processing unit 320 is further configured to determine group information corresponding to a third index value in the first index value set, where a number of SRS resource sets corresponding to the third index value is 1. The processing unit 320 determines, based on the group information corresponding to the third index value, group information corresponding to a fourth index value in the first index value set, where a number of SRS resource sets corresponding to the fourth index value is greater than 1. The processing unit 320 determines the transmit power of the PUSCH based on the group information.

In a possible implementation, SRS resources corresponding to the fourth index value include SRS resources that belong to the first SRS resource set and the second SRS resource set. The processing unit 320 is further configured to separately determine group information corresponding to an SRS resource belonging to the first SRS resource set and group information corresponding to an SRS resource belonging to the second SRS resource set.

In a possible implementation, the SRS resources corresponding to the fourth index value include a first SRS resource. The first SRS resource and a second SRS resource corresponding to the third index value belong to a same SRS resource set. Group information corresponding to the first SRS resource is the same as the group information corresponding to the third index value.

Figure 7:
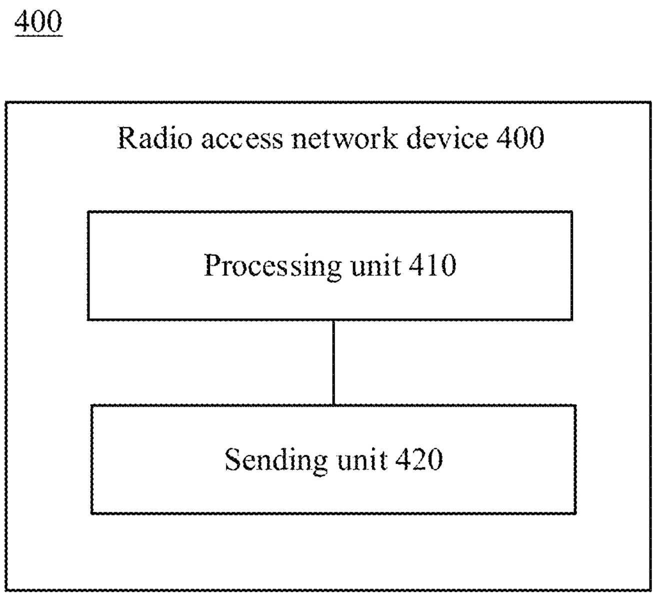
FIG. 7 is a schematic block diagram of an example of a radio access network device according to an embodiment of this application.

FIG. 7 is a schematic block diagram of an example of a radio access network device according to an embodiment of this application. As shown in FIG. 7, the radio access network device 400 includes:

a processing unit 410, configured to determine an SRS resource indication SRI, where an index value included in the SRI belongs to a first index value set, the first index value set includes a first index value and a second index value, the first index value and the second index value correspond to a plurality of same SRS resources, the first index value and the second index value correspond to different SRS resource sets for which power is to be adjusted, and the SRI indicates the terminal device to send the physical uplink shared channel PUSCH data; and a sending unit 420 is configured to send the SRI.

In a possible implementation, the processing unit 410 is further configured to determine transmit power control TPC indication information. The TPC indication information is used to adjust transmit power of PUSCH transmission corresponding to a first SRS resource set in the plurality of SRS resource sets. The first SRS resource set is one of the plurality of SRS resource sets. The SRI includes the first index value or the second index value. The first index value and the second index value correspond to different first SRS resource sets. The processing unit 410 determines the first SRS resource set, and determines the SRI based on the first SRS resource set. The sending unit 420 sends the TPC indication information.

In a possible implementation, the first index value and the second index value correspond to different 1st SRS resources. The first SRS resource is an SRS resource set to which the 1st SRS resource belongs.

In a possible implementation, the plurality of SRS resource sets further include a second SRS resource set. The first SRS resource set and the second SRS resource set correspond to different time domain elements of the PUSCH.

In a possible implementation, the processing unit 410 is configured to determine group information corresponding to a third index value in the first index value set, where a number of SRS resource sets corresponding to the third index value is 1. The processing unit 410 determines, based on the group information corresponding to the third index value, group information corresponding to a fourth index value in the first index value set, where a number of SRS resource sets corresponding to the fourth index value is greater than 1. The processing unit 410 determines the transmit power of the PUSCH based on the group information.

In a possible implementation, SRS resources corresponding to the fourth index value include SRS resources that belong to the first SRS resource set and the second SRS resource set. The processing unit 410 is configured to separately determine group information corresponding to an SRS resource belonging to the first SRS resource set and group information corresponding to an SRS resource belonging to the second SRS resource set.

In a possible implementation, the SRS resources corresponding to the fourth index value include a first SRS resource. The first SRS resource and a second SRS resource corresponding to the third index value belong to a same SRS resource set. Group information corresponding to the first SRS resource is the same as the group information corresponding to the third index value.

Figure 8:
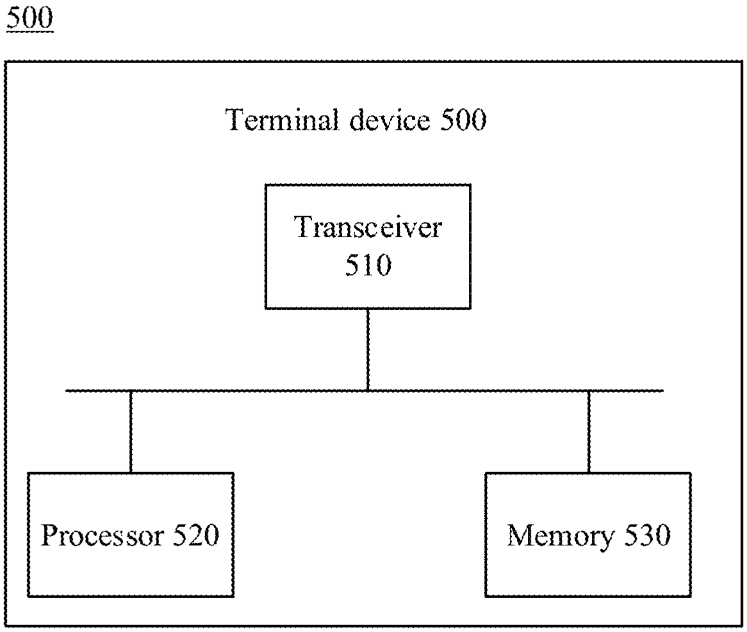
FIG. 8 is a schematic block diagram of another example of a terminal device according to an embodiment of this application.

FIG. 8 is a schematic block diagram of another example of a terminal device according to an embodiment of this application. As shown in FIG. 8, the terminal device 500 includes a transceiver 510 and a processor 520. The processor 520 is configured to support the terminal device in implementing corresponding functions of the terminal device in the foregoing methods. Optionally, the terminal device 500 may further include a memory 530, and the memory 530 is configured to: be coupled to the processor 520, and store a program instruction and data that are necessary for the terminal device 500. The processor 520 is specifically configured to execute the instruction stored in the memory 530. When the instruction is executed, the terminal device performs the method performed by the terminal device in the foregoing methods.

It should be noted that the terminal device 300 shown in FIG. 6 may be implemented by the terminal device 500 shown in FIG. 8. For example, the receiving unit 310 and the sending unit 330 shown in FIG. 6 may be implemented by the transceiver 510, and the processing unit 320 may be implemented by the processor 520.

Figure 9:
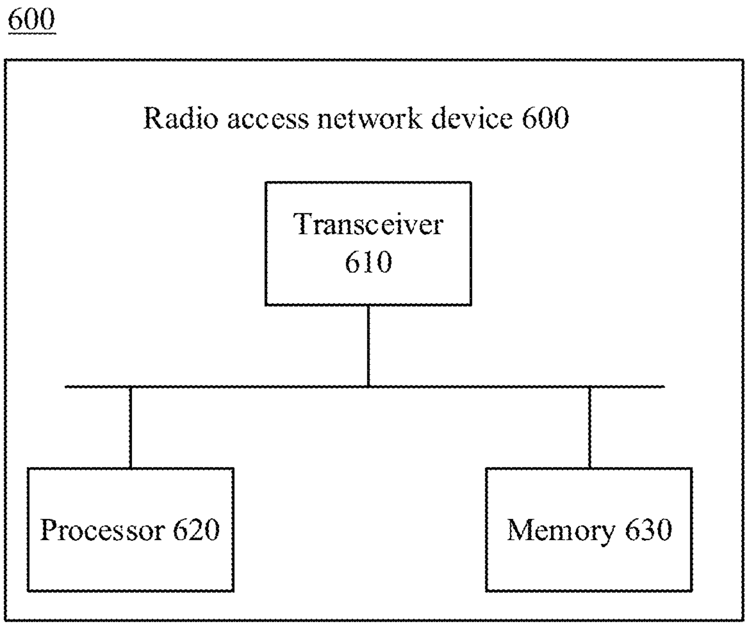
FIG. 9 is a schematic block diagram of another example of a radio access network device according to an embodiment of this application.

FIG. 9 is a schematic block diagram of another example of a radio access network device according to an embodiment of this application. As shown in FIG. 9, the radio access network device 600 includes a transceiver 610 and a processor 620. The processor 620 is configured to support the radio access network device in performing a corresponding function of the radio access network device in the foregoing methods. Optionally, the radio access network device may further include a memory 630, and the memory 630 is configured to: be coupled to the processor 620, and store a program instruction and data that are necessary for the radio access network device. The processor 620 is specifically configured to execute the instruction stored in the memory 630. When the instruction is executed, the radio access network device performs the method performed by the radio access network device in the foregoing methods.

It should be noted that the radio access network device 400 shown in FIG. 7 may be implemented by using the radio access network device 600 shown in FIG. 9. For example, the sending unit 420 shown in FIG. 7 may be implemented by the transceiver 610, and the processing unit 410 may be implemented by the processor 620.

It should be noted that, this application uses the terminal device and the radio access network device as examples to describe the indication method, the terminal device, and the radio access network device in embodiments of this application. It should be understood that the indication method in embodiments of this application may further be implemented by two baseband chips. A first baseband chip of the two baseband chips is configured to implement related operations of the terminal device in embodiments of this application, and a second baseband chip of the two baseband chips is configured to implement related operations of the radio access network device in embodiments of this application.

It should be further noted that an input/output circuit of the first baseband chip can be configured to implement related operations of the transceiver of the foregoing terminal device, and an input/output circuit of the second baseband chip can be configured to implement related operations of the transceiver of the foregoing radio access network device.

It should be understood that, the processor in embodiments of this application may be a central processing unit (CPU). The processor may be further another general-purpose processor, a digital signal processor (DSP), an application-specific integrated circuit (ASIC), a field programmable gate array (FPGA), or another programmable logic device, discrete gate or transistor logic device, discrete hardware component, or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the processes or the functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, and a magnetic tape), an optical medium (for example, a digital versatile disc (DVD)), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is only an example. For example, division into the units is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a radio access network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An indication method, comprising:

receiving indication information that indicates a plurality of sounding reference signal (SRS) resources, wherein the indication information comprises an index value, the index value belongs to a first index value set, the first index value set comprises a first index value and a second index value, wherein the first index value indicates resources of a first SRS resource set and a second SRS resource set, wherein the first index value corresponds to a first order of the first SRS resource set followed by the second SRS resource set, and the second index value indicates resources of the first SRS resource set and the second SRS resource set, wherein the second index value corresponds to a second order of the second SRS resource set followed by the first SRS resource set; and sending physical uplink shared channel (PUSCH) data based on the indication information.

2. The method according to claim 1, wherein the first index value set further comprises a third index value, and the third index value corresponds to one of the first SRS resource set or the second SRS resource set.

3. The method according to claim 1, wherein the first index value and the second index value indicate a mapping order between the respective SRS resource set and different PUSCH time-frequency resources.

4. The method according to claim 1, wherein the index value is the first index value or the second index value, and the method further comprises:

receiving, by the terminal device, transmit power control (TPC) indication information, wherein the TPC indication information comprises information for adjusting transmit power of PUSCH transmission corresponding to a first SRS resource set in the plurality of SRS resource sets, and the first SRS resource set is one of the plurality of SRS resource sets; and determining, by the terminal device, the first SRS resource set based on the SRI, wherein the first index value and the second index value correspond to different first SRS resource sets.

5. A communication apparatus, comprising:

at least one processor configured with processor-executable instructions to perform operations comprising:

receiving indication information indicating a plurality of sounding reference signal (SRS) resources, wherein the indication information comprises an index value, the index value belongs to a first index value set, the first index value set comprises a first index value and a second index value, wherein the first index value indicates resources of a first SRS resource set and a second SRS resource set, wherein the first index value corresponds to a first order of the first SRS resource set followed by the second SRS resource set, and the second index value indicates resources of the first SRS resource set and the second SRS resource set, wherein the second index value corresponds to a second order of the second SRS resource set followed by the first SRS resource set; and sending physical uplink shared channel (PUSCH) data based on the indication information.

6. The communication apparatus according to claim 5, wherein the first index value set further comprises a third index value, and the third index value corresponds to one of the first SRS resource set or the second SRS resource set.

7. The communication apparatus according to claim 5, wherein the first index value and the second index value indicate a mapping order between the respective SRS resource set and different PUSCH time-frequency resources.

8. The communication apparatus according to claim 5, wherein the index value is the first index value or the second index value, and the processor-executable instructions configure the at least one processor to:

receive transmit power control (TPC) indication information, wherein the TPC indication information comprises information for adjusting transmit power of PUSCH transmission corresponding to a first SRS resource set in the plurality of SRS resource sets, and the first SRS resource set is one of the plurality of SRS resource sets; and determine the first SRS resource set based on the SRI, wherein the first index value and the second index value correspond to different first SRS resource sets.

9. A non-transitory computer-readable storage medium storing computer instructions, that when executed by at least one processor, cause the at least one processor to perform operations comprising:

receiving indication information indicating a plurality of sounding reference signal (SRS) resources, wherein the indication information comprises an index value, the index value belongs to a first index value set, the first index value set comprises a first index value and a second index value, wherein the first index value indicates resources of a first SRS resource set and a second SRS resource set, wherein the first index value corresponds to a first order of the first SRS resource set followed by the second SRS resource set, and the second index value indicates resources of the first SRS resource set and the second SRS resource set, wherein the second index value corresponds to a second order of the second SRS resource set followed by the first SRS resource set; and sending physical uplink shared channel (PUSCH) data based on the indication information.

10. The non-transitory computer-readable storage medium according to claim 9, wherein the first index value set further comprises a third index value, and the third index value corresponds to one of the first SRS resource set or the second SRS resource set.

11. The non-transitory computer-readable storage medium according to claim 9, wherein the first index value and the second index value indicate a mapping order between the respective SRS resource set and different PUSCH time-frequency resources.

12. The non-transitory computer-readable storage medium according to claim 9, wherein the index value is the first index value or the second index value, and the operations further comprises:

receiving, by the terminal device, transmit power control (TPC) indication information, wherein the TPC indication information comprises information for adjusting transmit power of PUSCH transmission corresponding to a first SRS resource set in the plurality of SRS resource sets, and the first SRS resource set is one of the plurality of SRS resource sets; and determining, by the terminal device, the first SRS resource set based on the SRI, wherein the first index value and the second index value correspond to different first SRS resource sets.

* * * * *